US012684353B2

(12) United States Patent
Li et al.

(10) Patent No.: US 12,684,353 B2
(45) Date of Patent: Jul. 14, 2026

(54) SECURE COMMUNICATION METHOD AND APPARATUS

(71) Applicant: Huawei Technologies Co., Ltd., Shenzhen (CN)

(72) Inventors: He Li, Shanghai (CN); Rong Wu, Shenzhen (CN); YIzhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 433 days.

(21) Appl. No.: 18/164,131

(22) Filed: Feb. 3, 2023

(65) Prior Publication Data

US 2023/0188997 A1 Jun. 15, 2023

Related U.S. Application Data

(63) Continuation of application No. PCT/CN2020/107577, filed on Aug. 6, 2020.

(51) Int. Cl.
*H04W 12/106* (2021.01)
*H04W 12/041* (2021.01)
(Continued)

(52) U.S. Cl.
CPC ....... *H04W 12/106* (2021.01); *H04W 12/041* (2021.01); *H04W 12/0431* (2021.01); *H04W 12/63* (2021.01); *H04W 12/75* (2021.01)

(58) Field of Classification Search
CPC ............. H04W 12/106; H04W 12/041; H04W 12/0431; H04W 12/63; H04W 12/75
See application file for complete search history.

(56) References Cited

U.S. PATENT DOCUMENTS 10,531,290 B2 * 1/2020 Zhong .................. H04W 12/04
10,582,380 B2 3/2020 Lehtovirta et al.
(Continued)

FOREIGN PATENT DOCUMENTS

CN 105611533 A 5/2016
CN 106105140 A 11/2016
(Continued)

OTHER PUBLICATIONS

3rd Generation Partnership Project, "Technical Specification Group Services and System Aspects Proximity-based Services (ProSe) Security aspects(Release 13)", 3GPP TS 33.303 V13.5.0(Jun. 2017), total 90 pages.

(Continued)

*Primary Examiner* — Blake I Narramore
(74) *Attorney, Agent, or Firm* — WOMBLE BOND DICKINSON (US) LLP

(57) ABSTRACT

A secure communication method and apparatus are disclosed, to ensure security of a direct communication between terminal devices. In this application, a first terminal device may receive a key generation parameter from a first network element, where the key generation parameter includes a ProSe temporary identity of the first terminal device. Then, the first terminal device may generate a first discovery key based on the key generation parameter. The first terminal device sends a ProSe request message, where the ProSe request message includes the ProSe temporary identity and a message integrity code, and the message integrity code is generated based on the discovery key. The second terminal device receives the ProSe request message, and verifies the first terminal device based on the message integrity code, to ensure the security of a direct communication between the first terminal device and the second terminal device.

18 Claims, 9 Drawing Sheets

(51) Int. Cl.
    H04W 12/0431     (2021.01)
    H04W 12/63     (2021.01)
    H04W 12/75     (2021.01)

(56) References Cited

U.S. PATENT DOCUMENTS

| | | | |
|---|---|---|---|
| 2013/0290696 A1* | 10/2013 | Broustis | H04L 9/14 |
| | | | 713/150 |
| 2015/0271675 A1* | 9/2015 | Cheng | H04W 12/106 |
| | | | 455/410 |
| 2015/0339718 A1* | 11/2015 | Walton | G06Q 30/0261 |
| | | | 705/14.58 |
| 2016/0065362 A1* | 3/2016 | Choyi | H04L 63/065 |
| | | | 380/279 |
| 2016/0149876 A1* | 5/2016 | Zhang | H04W 12/106 |
| | | | 726/4 |
| 2017/0195877 A1* | 7/2017 | Lehtovirta | H04W 8/005 |
| 2018/0054237 A1* | 2/2018 | Tseng | H04W 36/0022 |
| 2018/0124578 A1* | 5/2018 | Sedlacek | H04W 4/10 |
| 2018/0270653 A1* | 9/2018 | Wifvesson | H04W 48/16 |
| 2019/0349765 A1* | 11/2019 | Kolekar | H04W 12/068 |
| 2019/0364424 A1* | 11/2019 | Vanderveen | H04W 12/041 |
| 2021/0021994 A1* | 1/2021 | Kolekar | H04W 8/24 |
| 2021/0051473 A1* | 2/2021 | Escott | H04W 12/106 |

FOREIGN PATENT DOCUMENTS

| | | |
|---|---|---|
| CN | 106464726 A | 2/2017 |
| CN | 107113594 A | 8/2017 |
| CN | 107852418 A | 3/2018 |
| WO | 2015179079 A1 | 11/2015 |
| WO | 2017003618 A1 | 1/2017 |

OTHER PUBLICATIONS

3GPP TS 23.501 V16.5.1:"3rd Generation Partnership Project; Technical Specification Group Services and System Aspects; System architecture for the 5G System (5GS); Stage 2 (Release 16)",Aug. 2020, total 440 pages.

3GPP TR 23.752 V0.4.0:"3rd Generation Partnership Project; Technical Specification Group Services and System Aspects; Study on system enhancement for Proximity based Services (ProSe) in the 5G System (5GS)(Release 17)",Jun. 2020, total 121 pages.

* cited by examiner

SECURE COMMUNICATION METHOD AND APPARATUS

CROSS-REFERENCE TO RELATED APPLICATIONS

This application is a continuation of International Application No. PCT/CN2020/107577, filed on Aug. 6, 2020, the disclosure of which is hereby incorporated by reference in its entirety.

TECHNICAL FIELD

This application relates to the field of communications technologies, and in particular, to a secure communication method and apparatus.

BACKGROUND

Currently, in a ProSe scenario, terminal devices may directly communicate with each other, and one terminal device may provide a proximity service for another terminal device, to exchange data.

A manner of establishing a direct communication between terminal devices is described below by using an example in which a first terminal device (UE) is a terminal device that requests a proximity service, and a second terminal device is a terminal device that provides the proximity service.

First, the first terminal device and the second terminal device separately interact with a 5G direct discovery name management function network element, to obtain respective ProSe parameters, for example, a ProSe application code and a discovery filter.

Then, the first terminal device sends, to a surrounding terminal device, a ProSe request message including the ProSe parameter of the first terminal device. After receiving the ProSe request, the second terminal device determines, based on the ProSe parameter of the first terminal device carried in the ProSe request, whether a proximity service can be provided, for example, determines whether the ProSe parameter of the first terminal device matches the ProSe parameter of the second terminal device. If determining that a proximity service can be provided, the second terminal device may establish a direct communication with the first terminal device, to exchange data.

It can be learned from the foregoing process that, an identity of the other party is not verified before the direct communication is established between the terminal devices, the first terminal device cannot determine whether the second terminal device is a terminal device that can really provide a proximity service, and the second terminal device cannot determine whether the first terminal device is a terminal device that really needs a proximity service either, resulting in poor security of the direct communication between the terminal devices.

SUMMARY

This application provides a secure communication method and apparatus, to ensure security of a direct communication between terminal devices.

According to a first aspect, an embodiment of this application provides a secure communication method. In the method, a first terminal device may receive a key generation parameter, for example, receive the key generation parameter from a first network element. The key generation parameter includes a ProSe temporary identity of the first terminal device. Then, the first terminal device may generate a first discovery key of the first terminal device based on a root key and the key generation parameter, where the first discovery key may be a discovery key at a ProSe granularity of the first terminal device. When the first terminal device determines that a proximity service needs to be performed, for example, when the first terminal device starts an application corresponding to the proximity service, the first terminal device may send a ProSe request message, where the ProSe request message includes a ProSe temporary identity and a message integrity code, and the message integrity code is generated based on the first discovery key.

According to the foregoing method, when needing to establish a direct communication with another terminal device, the first terminal device may send the ProSe request message carrying the message integrity code, so that a second terminal device may verify the first terminal device based on the message integrity code, to ensure the security of the direct communication between the first terminal device and the second terminal device.

In an embodiment, the first terminal device may obtain the key generation parameter in a plurality of manners. The first terminal device may send a parameter obtaining request to the first network element, where the parameter obtaining request may be used to request a ProSe parameter of the first terminal device, and the parameter obtaining request includes an identity of the first terminal device. Then, the first terminal device may receive a parameter obtaining response from the first network element, where the parameter obtaining response may include the ProSe parameter of the first terminal device, and the ProSe parameter of the first terminal device includes a ProSe temporary identity, a current time, a MAX offset, and the like of the first terminal device. Some or all of the ProSe parameters may be used as the key generation parameters, that is, the parameter obtaining response includes the key generation parameters.

According to the foregoing method, when requesting the ProSe parameter from the first network element, in addition to obtaining the ProSe parameter, in an embodiment, the first terminal device may further obtain the key generation parameter.

In an embodiment, when generating the message integrity code based on the first discovery key, the first terminal device may directly generate the message integrity code based on the first discovery key, or may generate a subkey based on the first discovery key; and then generates the message integrity code based on the subkey.

According to the foregoing method, the first terminal device can generate the message integrity code more flexibly, which is applicable to different scenarios.

In an embodiment, the parameter obtaining response further includes a validity time of the ProSe temporary identity, for example, the parameter obtaining response includes a current time, a MAX offset, and a validity timer. The current time, the MAX offset, and the validity timer may be used to indicate the validity time of the ProSe temporary identity.

According to the foregoing method, the ProSe temporary identity has a validity time, so that the security of the ProSe temporary identity can be ensured.

In an embodiment, the validity time of the ProSe temporary identity may be used as a validity time of the first discovery key. After the first terminal device determines that the validity time of the ProSe temporary identity expires, the first terminal device deletes the first discovery key.

According to the foregoing method, it can be ensured that the first discovery key is deleted when the ProSe temporary identity is invalid, to ensure security and effectiveness of the first discovery key.

In an embodiment, the key generation parameter further includes some or all of the ProSe parameters except the ProSe temporary identity that are allocated by the first network element to the first terminal device, for example, some or all of the current time and the MAX offset. The key generation parameter may further include other parameters, for example, a counter value, and the like.

According to the foregoing method, the key generation parameter may include parameters of different types, so that a manner of generating the discovery key is more flexible.

In an embodiment, the root key may be any one of the following: Kausf, Kamf, Kakma, or a pre-configured key.

According to the foregoing method, different keys may be selected as root keys, which is applicable to different scenarios.

According to a second aspect, an embodiment of this application provides a secure communication method. In the method, a first network element may deliver a key generation parameter. For example, the first network element may send a key generation parameter to a first terminal device, where the key generation parameter includes a ProSe temporary identity of the first terminal device, the key generation parameter is a parameter required when the first terminal device generates a first discovery key (that is, a discovery key at a ProSe granularity) of the first terminal device, and the parameter may be a parameter that is not stored or cannot be learned by the first terminal device. The first network element may further receive a verification request from a second terminal device, where the verification request includes a ProSe temporary identity and a message integrity code; and the first network element obtains the first discovery key of the first terminal device based on the ProSe temporary identity, and generates an expected message integrity code based on the first discovery key.

The first network element sends a verification response to the second terminal device after verifying the first terminal device based on the message integrity code and the expected message integrity code, where the verification response indicates a verification result for the first terminal device, and the verification result indicates that verification performed on the first terminal device succeeds or fails.

According to the foregoing method, the first network element can send the key generation parameter to the first terminal device, so that the first terminal device can generate the first discovery key, and further generate the message integrity code. The first network element can further verify the first terminal device based on the message integrity code, and notify the second terminal device of a verification result in a timely manner, to ensure a secure direct communication between the first terminal device and the second terminal device.

In an embodiment, the first network element sends the key generation parameter to the first terminal device in a plurality of manners. For example, the first network element receives a parameter obtaining request from the first terminal device, where the parameter obtaining request may be used to request a ProSe parameter of the first terminal device, and the ProSe parameter is a parameter required by the first terminal device to perform a proximity service. The parameter obtaining request includes an identity of the first terminal device. The first network element allocates the ProSe parameter of the first terminal device to the first terminal device after an authorization check on the first terminal device based on the identity of the first terminal device succeeds, for example, allocates the ProSe temporary identity; the first network element obtains the first discovery key based on the ProSe temporary identity; and the first network element sends a parameter obtaining response to the first terminal device, where the parameter obtaining response may include the ProSe parameter of the first terminal device, the ProSe parameter of the first terminal device includes the ProSe temporary identity, a current time, a MAX offset, and the like of the first terminal device. Some or all of the ProSe parameters may be used as the key generation parameters, that is, the parameter obtaining response includes the key generation parameters.

According to the foregoing method, when allocating the ProSe parameter to the first terminal device, in an embodiment, the first network element may further send the key generation parameter to the first terminal device.

In an embodiment, the first network element may further store a correspondence between the ProSe temporary identity and the first discovery key.

According to the foregoing method, the first network element can conveniently and quickly determine the first discovery key based on the ProSe temporary identity.

In an embodiment, the parameter obtaining request may further include ProSe information of the first terminal device, where the ProSe information can indicate a proximity service that needs to be performed by the first terminal device. When the authorization check performed by the first network element on the first terminal device based on the identity of the first terminal device succeeds, the first network element may perform the authorization check on the first terminal device by itself. For example, the first network element obtains ProSe subscription information of the first terminal device from a unified data management network element based on the identity of the first terminal device and the ProSe information of the first terminal device; the first network element authenticates the first terminal device by comparing the ProSe information of the first terminal device with the ProSe subscription information of the first terminal device; and the authorization check on the first terminal device succeeds after the first network element determines that the ProSe information of the first terminal device is consistent with the ProSe subscription information of the first terminal device.

According to the foregoing method, the first network element can perform the authorization check on the first terminal device by itself, which is relatively fast and can ensure validity of the first terminal device.

In an embodiment, the parameter obtaining request further includes the ProSe information of the first terminal device. When the authorization check on the first terminal device based on the identity of the first terminal device succeeds, the first network element may also perform the authorization check on the first terminal device through another network element, for example, a unified data management network element, a ProSe application server, or another network element storing the ProSe subscription information of the first terminal device. The following uses an example in which the another network element is a unified data management network element, the first network element may send a check request to the unified data management network element, to request to perform an authorization check on the first terminal device, where the check request includes the identity of the first terminal device. The first network element may receive a check response from the unified data management network element, where the check response indicates that the authorization check performed on the first terminal device succeeds.

According to the foregoing method, the first network element conveniently performs the authorization check on the first terminal device through another network element, to ensure the validity of the first terminal device.

In an embodiment, the first network element obtains the first discovery key based on the ProSe temporary identity in a plurality of manners. Three manners are listed below:

1. The first network element generates the first discovery key based on the ProSe temporary identity and a root key, where the root key is a key allocated or pre-configured for the first terminal device, that is, the root key may be a key allocated by a network side to the first terminal device and stored on the network side when the first terminal device registers with the network side, where the key is the same as a key generated and stored by the first terminal device. Alternatively, the root key may be a key that is pre-configured on the network side and corresponding to the first terminal device, and the key is also pre-configured on a first terminal device side.

2. The first network element obtains the first discovery key from a key generation network element based on the ProSe temporary identity.

3. The first network element obtains a second discovery key from the key generation network element based on the identity, where the second discovery key may be a discovery key at a terminal device granularity of the first terminal device; and then the first network element may generate the first discovery key based on the second discovery key and the ProSe temporary identity.

According to the foregoing method, the first network element obtains the first discovery key in different manners, which is applicable to different scenarios, and extends an application scope.

In an embodiment, the key generation parameter further includes some or all of the ProSe parameters except the ProSe temporary identity that are allocated by the first network element to the first terminal device, for example, some or all of the current time and the MAX offset. The key generation parameter may further include other parameters, for example, a counter value, and the like.

According to the foregoing method, the key generation parameter may include parameters of different types, so that a manner of generating the discovery key is more flexible.

In an embodiment, when the first network element obtains the first discovery key from the key generation network element based on the ProSe temporary identity, the first network element may send a first key obtaining request to the key generation network element, where the first key obtaining request includes the identity and the ProSe temporary identity of the first terminal device, and the first key obtaining request may further carry other information, for example, a current time, a MAX offset, a part of or all of the ProSe information of the first terminal device, and the like; and then the first network element receives a first key obtaining response from the key generation network element, where the first key obtaining response includes the first discovery key.

According to the foregoing method, the first network element may conveniently and quickly obtain the first discovery key from the key generation network element.

In an embodiment, when the first network element obtains the second discovery key from the key generation network element based on the identity, the first network element may send a second key obtaining request to the key generation network element, where the second key obtaining request includes the identity of the first terminal device, and the first key obtaining request may further carry other information, for example, a part of or all of the ProSe information of the first terminal device; and then the first network element receives a second key obtaining response from the key generation network element, where the second key obtaining response includes the second discovery key.

According to the foregoing method, the first network element may obtain the second discovery key from the key generation network element, and then generates the first discovery key by itself. The first network element and the key generation network element do not need to exchange ProSe temporary identities, which can ensure security of the ProSe temporary identities.

In an embodiment, when the first network element generates the expected message integrity code based on the first discovery key, the first network element may generate a subkey based on the first discovery key, and then generates the expected message integrity code based on the subkey. Alternatively, the expected message integrity code may be directly generated based on the first discovery key.

According to the foregoing method, the first network element can generate the message integrity code more flexibly, which is applicable to different scenarios.

In an embodiment, the key generation network element is any one of the following network elements: an authentication server function network element, an access and mobility management function network element, an authentication and key management for applications anchor function network element, a bootstrapping server function network element, a 5G direct discovery name management function network element, or a key management network element, where the key management network element is a network element that stores the key pre-configured for the first terminal device. Therefore, the network element is applicable to different scenarios.

In an embodiment, the first network element may determine a validity time of the ProSe temporary identity, and store a correspondence between the validity time and the first discovery key.

According to the foregoing method, a validity time of the first discovery key is consistent with the validity time of the ProSe temporary identity.

In an embodiment, the first network element deletes the first discovery key after the validity time of the ProSe temporary identity expires.

According to the foregoing method, it can be ensured that the first discovery key is deleted when the ProSe temporary identity is invalid, to ensure security and effectiveness of the first discovery key.

According to a third aspect, an embodiment of this application provides a secure communication method. The method includes: receiving, by a key generation network element, a key obtaining request from a first network element, and feeding back a discovery key of a first terminal device to the first network element. Two manners are listed below.

Manner 1: The key generation network element may receive a first key obtaining request from the first network element, where the first key obtaining request includes an identity and a ProSe temporary identity of the first terminal device; the key generation network element determines a root key based on the identity of the first terminal device, where the root key is a key allocated or pre-configured for the first terminal device, and the root key may be locally stored in the key generation network element or may be obtained from a network element storing the root key; the key generation network element generates a first discovery key based on the root key and the ProSe temporary identity; and the key generation network element sends a first key obtaining response to the first network element, where the first key obtaining response includes the first discovery key.

Manner 2: The key generation network element receives a second key obtaining request from the first network element, where the second key obtaining request includes the identity of the first terminal device; the key generation network element determines a root key based on the identity of the first terminal device; the key generation network element generates a second discovery key based on the root key; and the key generation network element sends a second key obtaining response to the first network element, where the second key obtaining response includes the second discovery key.

According to the foregoing method, the key generation network element may feed back discovery keys of different types to the first network element in different scenarios.

In an embodiment, the key generation network element is any one of the following network elements: an authentication server function network element, an access and mobility management function network element, an authentication and key management for applications anchor function network element, a bootstrapping server function network element, a 5G direct discovery name management function network element, or a key management network element, where the key management network element is a network element that stores the key pre-configured for the first terminal device. Therefore, the network element is applicable to different scenarios.

According to a fourth aspect, an embodiment of this application provides a secure communication method. In the method, a second terminal device receives a ProSe request message sent by a first terminal device, where the ProSe request message includes a ProSe temporary identity and a message integrity code of the first terminal device; the second terminal device sends a verification request to the first network element after determining, based on the ProSe temporary identity, that a proximity service can be supported, where the verification request includes the ProSe temporary identity and the message integrity code; the second terminal device receives a verification response from the first network element, where the verification response indicates a verification result for the first terminal device; and the second terminal device determines, based on the verification result, whether to establish a direct communication with the first terminal device.

According to the foregoing method, the second terminal device receives the ProSe request message that carries the message integrity code and sent by the first terminal device, and may verify the first terminal device based on the message integrity code, to ensure security of the direct communication between the first terminal device and the second terminal device.

According to a fifth aspect, an embodiment of this application further provides a communication apparatus, where the communication apparatus is used in a first terminal device. For beneficial effects, reference may be made to the descriptions of the first aspect. Details are not described herein again. The apparatus has functions of implementing the behaviors in the method example in the first aspect. The functions may be implemented by hardware, or may be implemented by hardware executing corresponding software. The hardware or the software includes one or more modules corresponding to the foregoing function. In a possible design, a structure of the apparatus includes a receiving unit, a processing unit, and a sending unit. These units may perform corresponding functions in the method example in the first aspect. For details, reference may be made to the detailed descriptions in the method example. Details are not described herein again.

According to a sixth aspect, an embodiment of this application further provides a communication apparatus, where the communication apparatus is used in a first network element. For beneficial effects, reference may be made to the descriptions of the second aspect. Details are not described herein again. The apparatus has functions of implementing the behaviors in the method example in the second aspect. The functions may be implemented by using hardware or may be implemented by using hardware executing corresponding software. The hardware or the software includes one or more modules corresponding to the foregoing function. In a possible design, a structure of the apparatus includes a receiving unit, a processing unit, and a sending unit. These units may perform corresponding functions in the method example in the second aspect. For details, reference may be made to the detailed descriptions in the method example. Details are not described herein again.

According to a seventh aspect, an embodiment of this application further provides a communication apparatus, where the communication apparatus is used in a key generation network element. For beneficial effects, reference may be made to the descriptions of the third aspect. Details are not described herein again. The apparatus has functions of implementing the behaviors in the method example in the third aspect. The functions may be implemented by using hardware or may be implemented by using hardware executing corresponding software. The hardware or the software includes one or more modules corresponding to the foregoing function. In a possible design, a structure of the apparatus includes a receiving unit, a processing unit, and a sending unit. These units may perform corresponding functions in the method example in the third aspect. For details, reference may be made to the detailed descriptions in the method example. Details are not described herein again.

According to an eighth aspect, an embodiment of this application further provides a communication apparatus, where the communication apparatus is used in a second terminal device. For beneficial effects, reference may be made to the descriptions of the fourth aspect. Details are not described herein again. The apparatus has functions of implementing the behaviors in the method example in the fourth aspect. The functions may be implemented by using hardware or may be implemented by using hardware executing corresponding software. The hardware or the software includes one or more modules corresponding to the foregoing function. In a possible design, a structure of the apparatus includes a receiving unit, a processing unit, and a sending unit. These units may perform corresponding functions in the method example in the fourth aspect. For details, reference may be made to the detailed descriptions in the method example. Details are not described herein again.

According to a ninth aspect, an embodiment of this application further provides a communication apparatus, where the communication apparatus is used in a first terminal device. For beneficial effects, reference may be made to the descriptions of the first aspect. Details are not described herein again. A structure of the communication apparatus includes a processor and a memory. The processor is configured to support a session management network element in performing corresponding functions in the method in the first aspect. The memory is coupled to the processor, and stores program instructions and data that are necessary for the communication apparatus. The structure of the communication apparatus further includes a transceiver configured to communicate with another device.

According to a tenth aspect, an embodiment of this application further provides a communication apparatus, where the communication apparatus is used in a first network element. For beneficial effects, reference may be made to the descriptions of the second aspect. Details are not described herein again. A structure of the communication apparatus includes a processor and a memory. The processor is configured to support a first terminal device in performing corresponding functions in the method in the second aspect. The memory is coupled to the processor, and stores program instructions and data that are necessary for the communication apparatus. The structure of the communication apparatus further includes a communication interface configured to communicate with another device.

According to an eleventh aspect, an embodiment of this application further provides a communication apparatus, where the communication apparatus is used in a key generation network element. For beneficial effects, reference may be made to the descriptions of the third aspect. Details are not described herein again. A structure of the communication apparatus includes a processor and a memory, where the processor is configured to support an access and mobility management function network element in performing corresponding functions in the method of the foregoing third aspect. The memory is coupled to the processor, and stores program instructions and data that are necessary for the communication apparatus. The structure of the communication apparatus further includes a communication interface configured to communicate with another device.

According to a twelfth aspect, an embodiment of this application further provides a communication apparatus, where the communication apparatus is used in a second terminal device. For beneficial effects, reference may be made to the descriptions of the fourth aspect. Details are not described herein again. A structure of the communication apparatus includes a processor and a memory. The processor is configured to support a unified data management network element in performing corresponding functions in the method in the fourth aspect. The memory is coupled to the processor, and stores program instructions and data that are necessary for the communication apparatus. The structure of the communication apparatus further includes a transceiver configured to communicate with another device.

According to a thirteenth aspect, this application further provides a computer-readable storage medium. The computer readable storage medium stores instructions, and the instructions, when run on a computer, causing the computer to perform the methods described in the foregoing aspects.

According to a fourteenth aspect, this application further provides a computer program product including instructions, and the instructions, when run on a computer, causing the computer to perform the methods described in the foregoing aspects.

According to a fifteenth aspect, this application further provides a computer chip. The chip is connected to a memory. The chip is configured to read and execute a software program stored in the memory, to perform the methods in the foregoing aspects.

DESCRIPTION OF EMBODIMENTS

Figure 1A:
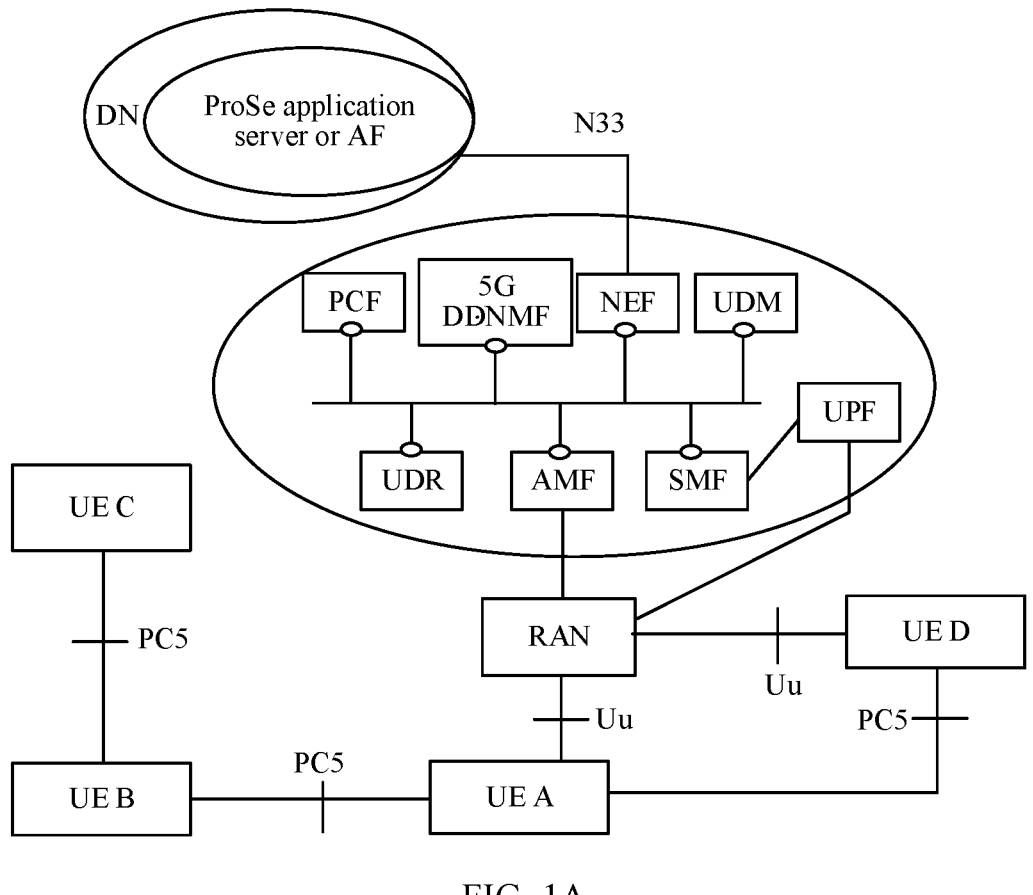
FIG. 1A is a diagram of a system architecture according to an embodiment of this application.

FIG. 1A is a schematic diagram of a specific system architecture to which this application is applicable. Network elements in the system architecture include terminal devices (UE). FIG. 1A exemplarily shows four UEs, namely, UE A, UE B, UE C, and UE D. The system architecture further includes a radio access network (RAN), an access and mobility management function (AMF) network element, a session management function (SMF) network element, a user plane function (UPF) network element, a unified data management (UDM) network element, a unified data repository (UDR) network element, an application function (AF) network element, a data network (DN), a network exposure function (NEF) network element, a 5G direct discovery name management function (5G DDNMF) network element, a policy control function (PCF) network element, a ProSe application server, and the like. The network elements such as the AMF network element, the SMF network element, the UDM network element, the NEF network element, and the PCF network element are core network elements in a $5^{th}$ generation mobile networks (5G) network architecture. Only some core network elements are exemplarily shown herein. The system architecture may further include other core network elements.

The terminal device is a device having a wireless transceiver function, and may be deployed on land, including an indoor or outdoor, handheld, or vehicle-mounted device; or may be deployed on water (for example, on a ship, and the like); or may be deployed in the air (for example, on an airplane, a balloon, a satellite, and the like). The terminal device may be a mobile phone, a pad, a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The terminal device in embodiments of this application may be a terminal device that can perform communication in a proximity service (ProSe) scenario, and the terminal device has a ProSe application function. Terminal devices having the ProSe application function can communicate with each other through a PC5 interface.

Two terminal devices are involved in embodiments of this application: a first terminal device and a second terminal device. The first terminal device may request another terminal device (including the second terminal device) to provide a proximity service for the first terminal device. When the second terminal device determines that a proximity service can be provided for the first terminal device, the proximity service may be provided for the first terminal device, and the second terminal device and the first terminal device may directly communicate with each other.

In different discovery scenarios, names of the second terminal device that provides a proximity service and the first terminal device that needs a proximity service are different. Two discovery scenarios are described herein: an open ProSe discovery scenario and a restricted ProSe discovery scenario. For related descriptions of the open ProSe discovery scenario and the restricted ProSe discovery scenario, reference may be made to the current technology. Details are not described herein.

For example, a user A plays a game by using a terminal device A, and the user A does not have a specific game partner and only needs to find a game partner "randomly". Such a scenario is an open ProSe discovery scenario. If the user A has a specific partner to play the game by using the terminal device A, the user A may "specify" a partner by using the terminal device A. Only the partner specified by the user A can access the game, and other partners cannot access the game. Such a scenario is a restricted ProSe discovery scenario.

In an embodiment, in embodiments of this application, a discovery model in the discovery scenario includes a model A or a model B. A difference between the model A and the model B is that, the discovery initiation manners of the terminal device in the discovery scenarios are different.

The model A involves one UE announcing "I am here". Terminal devices involved in the model A include an announcing UE and a monitoring UE. The announcing UE broadcasts "I am here". After receiving a message broadcast by the announcing UE, the monitoring UE determines, based on whether a service requirement of the monitoring UE is met, whether to establish a connection to the announcing UE.

The model B involves one UE asking "who is there/are you there". Terminal devices involved in the model B include a discoveree UE and a discoverer UE. The discoverer UE initiates a request including specific information, for example, "who is there/are you there". After receiving the request initiated by the discoverer UE, the discoveree UE determines, based on whether the discoveree UE can provide a service, whether to reply to the request. If the discoveree UE replies with a response, it indicates that "I am here". In embodiments of this application, the open ProSe discovery scenario is applicable only to one discovery model, that is, the model A, but the restricted ProSe discovery scenario is applicable to two discovery models, namely, the model A and the model B.

In embodiments of this application, a network side (for example, a core network element or a 5G DDNMF network element) may determine a type of the first terminal device or the second terminal device based on ProSe information reported by the first terminal device or the second terminal device to the network side. For example, a discovery command included in the ProSe information reported by the first terminal device or the second terminal device to the network side indicates whether the first terminal device or the second terminal device is an announcing UE or a monitoring UE; and whether the first terminal device or the second terminal device is a response UE or a query UE. The announcing UE and the monitoring UE are two terminal devices in the model A. The response UE and the query UE respectively correspond to the discoveree UE and the discoverer UE in the model B.

In embodiments of this application, before providing a proximity service for the first terminal device, the second terminal device needs to first verify an identity of the first terminal device, to determine whether the second terminal device is a terminal device that really needs the proximity service. Specifically, the second terminal device may report a message integrity code obtained from the first terminal device to the core network element or the 5G DDNMF network element. The message integrity code is generated based on a discovery key of the first terminal device, and the discovery key of the first terminal device is generated by using a key generation parameter obtained from the core network element or the 5G DDNMF network element. The core network element or the 5G DDNMF network element performs verification based on the message integrity code reported by the second terminal device and an expected message integrity code calculated by the 5G DDNMF network element based on the discovery key of the first terminal device. Alternatively, the second terminal device may obtain the discovery key of the first terminal device from the core network element or the 5G DDNMF network element, and the second terminal device calculates the expected message integrity code for verification.

Similarly, before accepting the proximity service provided by the second terminal device, the first terminal device may also first verify an identity of the second terminal device, to determine whether the second terminal device is a terminal device that can actually provide the proximity service. A specific manner is similar to a manner in which the second terminal device verifies the identity of the first terminal device.

A main function of a RAN is to control users to access a mobile communication network in a wireless manner. The RAN is a part of the mobile communication system. The RAN implements a radio access technology. Conceptually, the RAN resides in a device (for example, a mobile phone, a computer, or any remote controller), and provides a connection between the device and a core network.

The AMF network element is responsible for access management and mobility management of the terminal device. In actual application, the AMF network element has a mobility management function of an MME in a network architecture in LTE as well as an access management function.

In an embodiment, the AMF network element can further generate a discovery key of the terminal device by using Kamf, and send the discovery key of the terminal device to the 5G DDNMF network element or another network element (for example, the ProSe application server).

Kamf is a root key of the terminal device, and is a key that is allocated by the network side (for example, the AMF network element) to the terminal device and separately stored on a terminal device side and an AMF side when the terminal device registers with a network.

The SMF network element is responsible for session management such as user session establishment.

The PCF network element is a control plane function provided by an operator, and is configured to provide session policies for the SMF network element. The policies may include a charging-related policy, a QoS-related policy, an authorization-related policy, and the like.

The UPF network element is a user-plane function network element, and is mainly responsible for connecting to an external network. The UPF network element has related functions of a serving gateway (SGW) and a public data network gateway (PDN-GW) in LTE.

The DN is a network responsible for providing a service for the terminal device. For example, some DNs provide a network access function for the terminal device, and some other DNs provide a short message function for the terminal device.

The UDM network element may store subscription information of a user, and implements HSS similar in 4G. In embodiments of this application, the UDM network element can determine a subscription permanent identifier (SUPI) of the UE based on an anonymized identifier or a temporary identity of the UE.

The UDR network element is mainly used to store the subscription information, policy data, structured data for opening, and application data of the user.

The AF network element may be a third-party application control platform, or may be an operator-specific device. The AF network element may provide services for a plurality of application servers.

The NEF network element exposes a capability and an event of another network element to a third-party partner or the AF network element. The NEF network element provides the AF network element with a method for securely providing information to a $3^{rd}$ generation partnership project (3GPP) network, and can verify, authorize, and assist in restricting the AF network element. In addition, the NEF network element may further convert information exchanged by the AF network element and information exchanged by a core network function network element.

The ProSe application server stores user identities of proximity services, and may further verify the terminal devices in the discovery scenarios. The ProSe application server may further store a key pre-configured for the terminal device, where the key is a key related to the proximity service.

In actual application, the ProSe application server may be an AF network element, that is, an AF network element having functions of the ProSe application server. In this way, the Prose application server and the UE may perform user plane communication through a path of UE-RAN-UPF-AF. The Prose application server may further communicate with another core network element through the NEF network element. For example, the Prose application server communicates with the PCF network element through the NEF network element.

In the open ProSe discovery scenario, the 5G DDNMF network element may allocate a ProSe application ID and a ProSe application code, and process a mapping between the ProSe application ID and the ProSe application code. In the restricted ProSe discovery scenario, the 5G DDNMF network element may communicate with the ProSe application server through a PC2 interface, and is configured to process authorization of a discovery request, allocate a ProSe discovery UE ID and a ProSe restricted code, and process a mapping between the ProSe discovery UE ID and the ProSe restricted code. Both the ProSe application code and the ProSe restricted code may be used as ProSe temporary identities mentioned in embodiments of this application.

In embodiments of this application, a security function is included in the 5G DDNMF network element, so that identities of the terminal devices (for example, the first terminal device and the second terminal device) can be verified. For example, after receiving the message integrity code from the first terminal device that is reported by the second terminal device, the 5G DDNMF network element may generate the expected message integrity code by using the discovery key of the first terminal device, and notify, after determining that the message integrity code is consistent with the expected message integrity code, that the second terminal device succeeds in verifying the first terminal device.

It should be noted that, the description is provided herein only by using an example in which a security function is added to the 5G DDNMF network element. The security function may also be added to another network element, for example, the core network element or the ProSe application Server, and the another network element interacts with the terminal devices, to verify an identity of another terminal device.

Although not shown, the core network element further includes an authentication server function (AUSF) network element, an authentication and key management for applications (AKMA) anchor function (AAnF) network element, a bootstrapping server function (BSF) network element, and the like. The AUSF network element has an authentication service function. In embodiments of this application, the AUSF network element can generate a discovery key of the terminal device by using Kausf of the terminal device, and send the discovery key of the terminal device to the 5G DDNMF network element. Similarly, the AAnF network element can generate a discovery key of the terminal device by using Kakma, and send the discovery key of the terminal device to the 5G DDNMF network element. The bootstrapping server function (BSF) network element can generate a discovery key of the terminal device by using Ks, and send the discovery key of the terminal device to the 5G DDNMF network element.

Kausf, Kakma, or Ks is also used as a root key used to generate the discovery key of the terminal device. The key is a key that is allocated by a network side to the terminal device and stored on the network side when the terminal device registers with a network. In addition, the key is the same as a key that is generated by the terminal device and stored on a terminal device side.

Figure 1B:
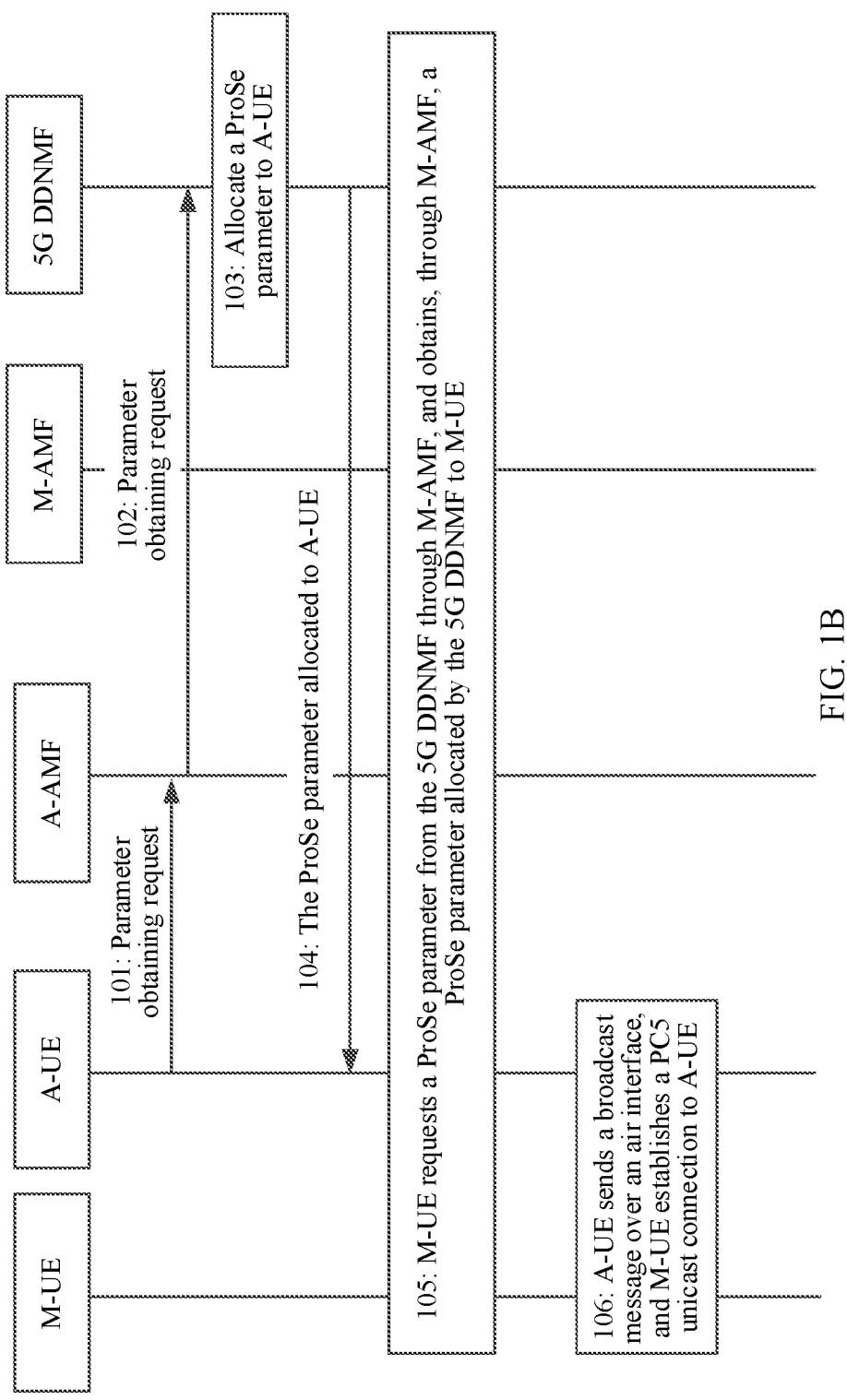
FIG. 1B is a schematic diagram of a method for direct communication between A-UE and M-UE.
Figure 2:
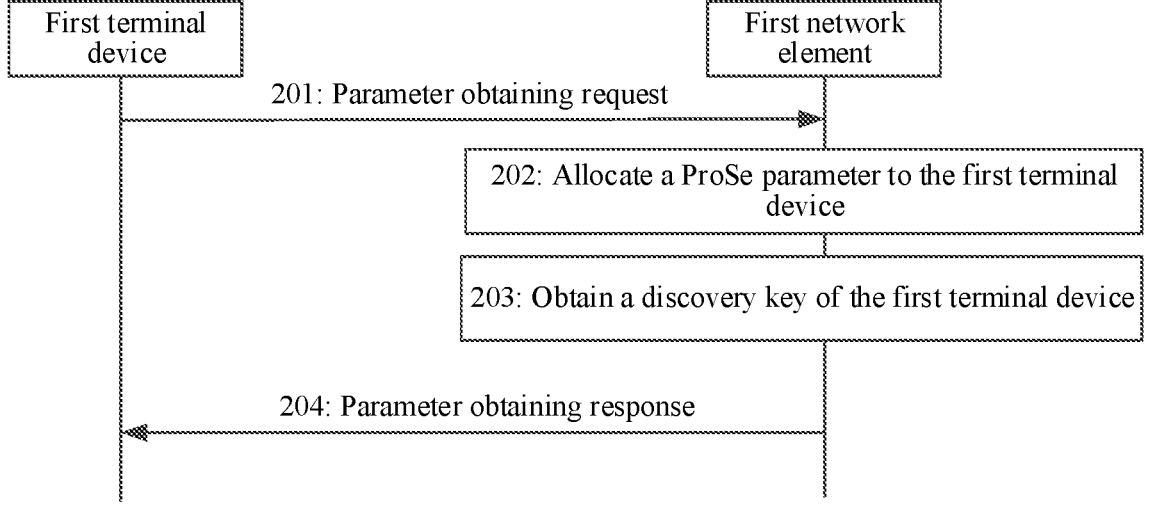
FIG. 2 is a schematic diagram of a method for obtaining a key generation parameter by a first terminal device according to this application.

Based on a system architecture shown in FIG. 1B, a manner of performing verification between UEs in the discovery scenario in the current technology is described below by using a manner of performing verification between A-UE (that is, the announcing UE) and M-UE (that is, the monitoring UE) in the open Prose discovery scenario as an example. An AMF that interacts with A-UE is identified as A-AMF, and an AMF that interacts with M-UE is identified as M-AMF. As shown in FIG. 2, the method includes the following steps.

Step 101: A-UE sends a parameter obtaining request to A-AMF, where the parameter obtaining request is used to request a ProSe parameter of A-UE, and the parameter obtaining request includes an identity of A-UE and ProSe information of A-UE. The identity of A-UE indicates A-UE. The ProSe information of A-UE indicates a proximity service required by A-UE.

The ProSe information of A-UE includes but is not limited to one or more of a user identity, a discovery model, a discovery command, a discovery type, or an application ID.

In the open ProSe discovery scenario, the user identity may be a ProSe application ID. Only the open ProSe discovery scenario is used as an example herein. In the restricted ProSe discovery scenario, the user identity may be a restricted ProSe application user ID (RPAUID).

Step 102: A-AMF forwards the parameter obtaining request to a 5G DDNMF.

Step 103: The 5G DDNMF allocates a ProSe parameter to A-UE after the 5G DDNMF receives the parameter obtaining request. The ProSe parameter includes but is not limited to: a ProSe application code, a validity time, and a discovery filter.

It should be noted that, in the open ProSe discovery scenario, the ProSe application code is an instruction allocated in the open ProSe discovery scenario. In the restricted ProSe discovery scenario, the ProSe application code is replaced with a ProSe restricted code.

Step 104: The 5G DDNMF sends, to A-UE through A-AMF, the ProSe parameter allocated to A-UE.

Step 105: M-UE requests the ProSe parameter from the 5G DDNMF through M-AMF, and obtains, through M-AMF, a ProSe parameter allocated by the 5G DDNMF to M-UE. A manner in which M-UE requests the ProSe parameter from the 5G DDNMF through M-AMF, and obtains, through M-AMF, the ProSe parameter allocated by the 5G DDNMF to M-UE is similar to a manner in which A-UE requests the ProSe parameter from the 5G DDNMF through A-AMF, and obtains, through A-AMF, the ProSe parameter allocated by the 5G DDNMF to A-UE. For details, reference may be made to steps 101 to 104. Details are not described herein again.

It should be noted that, a 5G DDNMF interacting with M-UE and a 5G DDNMF interacting with A-UE may be the same or may be different.

Step 106: A-UE sends a broadcast message over an air interface, where the broadcast message includes a Prose application Code, and M-UE receives the broadcast message and establishes a PC5 unicast connection to A-UE.

As can be learned from the foregoing process, in the discovery scenario, authentication is not performed between two terminal devices. Using the open ProSe discovery scenario as an example, A-UE cannot learn whether M-UE is UE capable of providing a proximity service for A-UE. M-UE may be an illegal UE that steals information of A-UE for resale and profit-making. In addition, M-UE cannot determine whether A-UE is a UE that actually needs the proximity service. A-UE may be an attacker that establishes a connection to M-UE by broadcasting the Prose application code. As a result, M-UE cannot establish a connection to another A-UE. Therefore, currently, establishing a connection and performing a direct communication between A-UE and M-UE have relatively poor security.

To ensure security of two terminal devices that directly communicate with each other, in this embodiment of this application, before the first terminal device establishes a direct communication with the second terminal device, verification may be performed between the first terminal device and the second terminal device. The process is as follows: The first terminal device may obtain a key generation parameter from a first network element, generate a discovery key by using the key generation parameter, and then generate a message integrity code by using the discovery key. When the second terminal device needs to verify an identity of the first terminal device, the second terminal device sends the message integrity code received from the first terminal device to the first network element, and requests the first network element to verify the first terminal device. After receiving the message integrity code, the first network element generates an expected message integrity code by using the stored discovery key of the first terminal device, succeeds in verifying the first terminal device after determining that the message integrity code is consistent with the expected message integrity code, and notifies the second terminal device that verification on the first terminal device succeeds. After determining that the first network element succeeds in verifying the first terminal device, the second terminal device may establish a connection to and directly communicate with the first terminal device. Similarly, the first terminal device may also verify the second terminal device in a similar manner. In this way, it can be ensured that the first terminal device and the second terminal device may determine an identity of each other before performing a direct communication, thereby ensuring security of the direct communication.

A secure communication method provided in this embodiment of this application is described below with reference to the accompanying drawings. The secure communication method provided in this embodiment of this application includes two parts. One part is that a first terminal device obtains a key generation parameter from a first network element, and the other part is that verification is performed between the first terminal device and a second terminal device. Descriptions are separately provided below.

(1) A first terminal device obtains a key generation parameter from a first network element.

FIG. 2 is a method for obtaining a key generation parameter according to an embodiment of this application. The method includes the following steps.

Step 201: The first terminal device sends a parameter obtaining request to the first network element, where the parameter obtaining request includes an identity of the first terminal device. The first network element may be a 5G direct discovery name management function network element, may be a ProSe application server, or may be another core network element. The identity of the first terminal device may be a subscription permanent identifier of the first terminal device, for example, an SUPI, a generic public subscription identifier (GPSI), or a permanent equipment identifier (PEI), may be an anonymized identifier of the first terminal device, for example, a subscription concealed identifier (SUCI), or may be a temporary identity of the first terminal device, where the temporary identity may be preallocated by a network side to the first terminal device, or may be allocated by the network side to the first terminal device after the first terminal device registers with a network, for example, a globally unique temporary UE identity (GUTI).

The parameter obtaining request may be used to request the first network element to allocate a ProSe parameter, where the ProSe parameter is a parameter required by the first terminal device to perform a proximity service, the ProSe parameter is allocated by the network side (for example, the 5G DDNMF network element or the core network element) to the first terminal device, and the ProSe parameter includes a ProSe temporary identity. The ProSe temporary identity is a temporary identity allocated by the first network element to the first terminal device for the proximity service, and is used for the terminal devices to discover each other through the ProSe temporary identity in a discovery scenario, to implement mutual search.

The ProSe temporary identity may be different in different discovery scenarios. For example, in the open ProSe discovery scenario, the ProSe temporary identity may be referred to as a ProSe application code, and in the restricted ProSe discovery scenario, the ProSe temporary identity may be referred to as a ProSe restricted code.

The parameter obtaining request may further include ProSe information of the first terminal device, where the ProSe information of the first terminal device indicates a proximity service required by the first terminal device. The ProSe information of the first terminal device includes some or all of the following:

a user identity, a discovery command, a discovery model, a discovery type, and an application identity of the first terminal device.

The user identity of the first terminal device may also be referred to as a Prose identity, and one user identity of the first terminal device is an application layer user identity of the first terminal device in a Prose scenario (that is, a discovery scenario). One user identity may be configured for an application corresponding to one proximity service in the first terminal device, a plurality of different user identities may be configured for an application corresponding to a same proximity service, and different user identities may be configured for applications corresponding to different proximity services. A quantity of user identities in the ProSe information of the first terminal device is not limited herein, and there may be one or more user identities.

The discovery command is used to identify a type of the first terminal device, and may indicate that the first terminal device is an announcing UE or a monitoring UE, or may indicate that the first terminal device is a response UE or a query UE.

The discovery type indicates a type of the discovery scenario of the first terminal device, for example, indicate open ProSe discovery or restricted ProSe discovery.

The discovery model indicates a discovery model of the first terminal device, for example, indicate a model A or a model B.

The application identity indicates an application corresponding to the proximity service. The application identity may be pre-configured in the first terminal device.

A manner in which the first terminal device sends the parameter obtaining request to the first network element is not limited in this embodiment of this application. The first terminal device may send the parameter obtaining request to the first network element through a control plane, or may send the parameter obtaining request to the first network element through a user plane. The two manners are described below.

1. The first terminal device sends the parameter obtaining request to the first network element through the control plane.

The first terminal device may send the parameter obtaining request to an access and mobility management function network element. After receiving the parameter obtaining request, the access and mobility management function network element may directly forward the parameter obtaining request to the first network element or may parse the parameter obtaining request, and send, after parsing the parameter obtaining request, the parsed parameter obtaining request to the first network element.

A specific type of a parsing operation performed by the access and mobility management function network element on the parameter obtaining request is not limited herein. For example, the access and mobility management function network element may verify the first terminal device based on the identity of the first terminal device. In another example, if the identity of the first terminal device is not a subscription permanent identifier, the access and mobility management function network element may determine the subscription permanent identifier of the first terminal device based on the identity of the first terminal device.

For example, the access and mobility management function network element may locally store a correspondence between the subscription permanent identifier of the first terminal device and the identity of the first terminal device. The access and mobility management function network element may determine the subscription permanent identifier of the first terminal device based on the identity of the first terminal device, replace the identity of the first terminal device in the parameter obtaining request with the subscription permanent identifier of the first terminal device, and then send, to the first network element, the parameter obtaining request in which the subscription permanent identifier of the first terminal device is replaced.

For example, the access and mobility management function network element may also request to obtain the subscription permanent identifier of the first terminal device from another network element (for example, a unified data management network element). The access and mobility management function network element may request the subscription permanent identifier of the first terminal device from the unified data management network element based on the identity of the first terminal device, replace the identity of the first terminal device in the parameter obtaining request with the subscription permanent identifier of the first terminal device after obtaining the subscription permanent identifier of the first terminal device from the unified data management network element, and then send, to the first network element, the parameter obtaining request in which the subscription permanent identifier of the first terminal device is replaced.

In an embodiment, if the access and mobility management function network element may further store information of a key generation network element, for example, an address or identity (ID) of the key generation network element, the key generation network element stores a root key and can generate a discovery key of the first terminal device based on the root key, the access and mobility management function network element may further carry the information of the key generation network element in the parameter obtaining request.

2. The first terminal device sends the parameter obtaining request to the first network element through the user plane.

The first terminal device may send the parameter obtaining request to the first network element through a user plane network element.

Step 202: After receiving the parameter obtaining request, the first network element may allocate a ProSe parameter, for example, a ProSe temporary identity, to the first terminal device.

Before receiving the parameter obtaining request and allocating the ProSe parameter to the first terminal device, the first network element may first perform an authorization check on the first terminal device.

A manner in which the first network element performs the authorization check on the first terminal device is not limited in this embodiment of this application. Two manners are listed below.

Manner 1: The first network element requests another network element to perform an authorization check. The another network element may be a network element that stores subscription information of a proximity service of the first terminal device, for example, a unified data management network element or a ProSe application server.

The first network element may send ProSe information of the first terminal device to the another network element, and may further send identity information of the first terminal device (for example, at least one of an identity or a user identity of the first terminal device) to the another network element, to request the another network element to perform the authorization check on the first terminal device. For example, the first network element may send a check request to the another network element, to request to perform the authorization check on the first terminal device, where the check request includes the ProSe information of the first terminal device and the identity information of the first terminal device.

It should be noted that, the identity of the first terminal device herein may be an identity carried in the parameter obtaining request sent by the first terminal device, or may be a subscription permanent identifier of the first terminal device obtained after the first terminal device sends the parameter obtaining request through the control plane and the access and mobility management function network element parses the parameter obtaining request.

After receiving the identity information of the first terminal device, the another network element may determine, based on the identity information of the first terminal device, the subscription information of the first terminal device related to the proximity service (which may also be referred to as the subscription information of the proximity service). For example, when the another network element is a unified data management network element, the unified data management network element may determine the subscription information of the first terminal device based on the identity of the first terminal device, and then determine the subscription information related to the proximity service (which may also be referred to as the subscription information of the proximity service) from the subscription information of the first terminal device based on the user identity. When the another network element is a ProSe application server, after receiving the user identity of the first terminal device, the ProSe application server may also directly determine the subscription information of the proximity service from the subscription information of the first terminal device based on the user identity.

After determining the subscription information of the proximity service, the another network element compares the subscription information of the proximity service with the ProSe information of the first terminal device, for example, check whether a discovery command and a discovery type in the ProSe information of the first terminal device are consistent with a discovery command and a discovery type in the subscription information of the proximity service.

After determining that the subscription information of the proximity service is consistent with the ProSe information of the first terminal device, the another network element determines that the authorization check on the first terminal device succeeds; determines that the authorization check on the first terminal device fails if the subscription information of the proximity service is inconsistent with the ProSe information of the first terminal device, and the another network element may send a result of the authorization check (for example, the authorization check succeeds or fails) to the first network element. For example, the another network element may feed back a check response to the first network element, where the check response indicates that the authorization check on the first terminal device succeeds or fails.

If the authorization check succeeds, the first network element may allocate a ProSe parameter to the first terminal device; if the authorization check fails, the first network element may reject the parameter obtaining request of the first terminal device without allocating the ProSe parameter to the first terminal device.

Manner 2: The first network element performs an authorization check by itself.

The first network element may send at least one of the identity or the user identity of the first terminal device to the another network element, to request all subscription information of the first terminal device related to the proximity service (which may also be referred to as all subscription information of the proximity service) or subscription information of the proximity service of the first terminal device.

After receiving the at least one of the identity or the user identity of the first terminal device, the another network element may determine all the subscription information of the proximity service of the first terminal device or the subscription information of the proximity service of the first terminal device based on the identity of the first terminal device, and the another network element sends all the subscription information of the proximity service of the first terminal device or the subscription information of the proximity service of the first terminal device to the first network element. For example, the first network element sends at least one of the identity or the user identity of the first terminal device to the another network element. The another network element determines all subscription information of the proximity service of the first terminal device or subscription information of the proximity service of the first terminal device based on the at least one of the identity or the user identity of the first terminal device, and sends all the subscription information of the proximity of the first terminal device or the subscription information of the proximity service of the first terminal device to the first network element. After obtaining all the subscription information of the proximity service of the first terminal device or the subscription information of the proximity service of the first terminal device, the first network element may store all the subscription information of the proximity service of the first terminal device or the subscription information of the proximity service of the first terminal device. In this way, a re-request process is reduced, and extra signaling overhead is avoided.

The first network element compares all the subscription information of the proximity service of the first terminal device (or the subscription information of the proximity service of the first terminal device) with the ProSe information of the first terminal device, for example, checks whether a discovery command and a discovery type in the ProSe information of the first terminal device are consistent with a discovery command and a discovery type in all the subscription information of the proximity service (or the subscription information of the proximity service of the first terminal device).

If the discovery command and the discovery type in the ProSe information of the first terminal device are consistent with the discovery command and the discovery type in all the subscription information of the proximity service (or the subscription information of the proximity service of the first terminal device), the first network element determines that the authorization check on the first terminal device succeeds; if the discovery command and the discovery type in the ProSe information of the first terminal device are inconsistent with the discovery command and the discovery type in all the subscription information of the proximity service (or the subscription information of the proximity service of the first terminal device), the first network element determines that the authorization check on the first terminal device fails and does not allocate a ProSe parameter to the first terminal device.

If the parameter obtaining request includes a plurality of user identities, for each user identity, the first network element may perform an authorization check in Manner 1 or Manner 2.

After succeeding in the authorization check on the first terminal device, the first network element may allocate a ProSe parameter to the first terminal device, where the ProSe parameter includes a ProSe temporary identity. The first network element may allocate, for each user identity, one ProSe temporary identity to the first terminal device, that is, each user identity corresponds to one ProSe temporary identity. ProSe temporary identities corresponding to different user identities may be the same or different.

In addition to the ProSe temporary identity, the ProSe parameter may further include a validity time of the ProSe temporary identity. There are a plurality of parameters that represent the validity time of the ProSe temporary identity, and the parameters include but are not limited to: a current time, a MAX offset, and a validity timer.

The current time is time information that represents a current time based on a coordinated universal time of the first network element. The MAX offset can indicate a time length of the validity time of the ProSe temporary identity, that is, a difference between an expiry time point and the current time of the ProSe temporary identity.

The validity timer is a timer for the validity time of the ProSe temporary identity. Each ProSe temporary identity corresponds to one validity timer, and validity timers corresponding to different ProSe temporary identities may be the same or different.

Step 203: The first network element obtains a discovery key of the first terminal device.

In this embodiment of this application, there are two different types of discovery keys of the first terminal device. One is a discovery key at a terminal device granularity, that is, one terminal device corresponds to one discovery key. The other is a discovery key at a ProSe granularity. Different proximity services correspond to different discovery keys.

The first network element may obtain the discovery key at the ProSe granularity based on the ProSe temporary identity, or may obtain the discovery key at the terminal device granularity based on the identity of the first terminal device.

In an embodiment, after obtaining the discovery key at the terminal device granularity, the first network element may further generate the discovery key at the ProSe granularity based on the discovery key at the terminal device granularity.

Step 204: The first network element sends a parameter obtaining response to the first terminal device, where the parameter obtaining response includes a key generation parameter. The key generation parameter is a parameter that is in parameters required for generating the discovery key of the first terminal device and needs to be sent to the first terminal device. Corresponding to discovery keys of different types, key generation parameters may also be different.

The parameter obtaining response may further include some or all of the following: a current time, a MAX offset, and a validity timer. In other words, the first terminal device may determine the validity time of the ProSe temporary identity from the parameter obtaining response.

The first network element obtains the discovery key of the first terminal device in a plurality of manners. The first network element may generate the discovery key of the first terminal device by itself, or request the discovery key from the key generation network element.

Two different manners are separately described below.

Manner 1. The first network element requests the discovery key from the key generation network element. The key generation network element may be an authentication server function network element (such as an AUSF network element), an access and mobility management function network element (such as an AMF network element), an authentication and key management for applications anchor function network element (such as an AAnF network element), a bootstrapping server function network element (such as a BSF network element), a 5G direct discovery name management function network element (such as a 5G DDNMF network element), or a key management network element. The key management network element is a network element that stores a key pre-configured for a terminal device (for example, the first terminal device or the second terminal device), where the pre-configured key may correspond to a user identity of the terminal device.

A specific type of the key generation network element is not limited in this embodiment of this application, and any network element that can generate the discovery key is applicable to this embodiment of this application.

A discovery key generation manner varies based on a type of the discovery key, and descriptions are separately provided below.

(1) the Discovery Key at the Terminal Device Granularity

The first network element sends a first key obtaining request to the key generation network element, where the first key obtaining request may include an identity of the first terminal device, and In an embodiment, may further include a part of or all of the ProSe information of the first terminal device.

After receiving the first key obtaining request, the key generation network element may determine a root key based on the identity of the first terminal device.

The root key is a key allocated to or pre-configured for the first terminal device. For example, the root key may be a key allocated and stored by a network side (for example, a unified data management network element or a key generation network element) to the first terminal device when the first terminal device registers with a network. The first terminal device may locally generate a key that is the same as the key on the network side, and store the key. In another example, the root key may alternatively be a key pre-configured on the network side, where the key corresponds to the first terminal device, and a same key is also pre-configured on a first terminal device side. A type of the pre-configured key is not limited in this embodiment of this application. In other words, the pre-configured key may be a symmetric key, or may be an asymmetric key.

Different types of key generation network elements store different root keys. For example, when the key generation network element is an authentication server function network element, the root key is Kausf. Kausf is Kausf in FIG. 6.2.1-1 in the standard TS33.501 v16.3.0. For generation and storage of Kausf, reference may be made to a generation and storage process of Kausf in FIG. 6.2.1-1 in the standard S33.501 v16.3.0. When the key generation network element is an access and mobility management function network element, the root key is Kamf. Kamf is Kamf in FIG. 6.2.1-1 in the standard TS33.501 v16.3.0. For generation and storage of Kamf, reference may be made to a generation and storage process of Kamf in FIG. 6.2.1-1 in the standard S33.501 v16.3.0. When the key generation network element is an AAnF network element, the root key is Kakma. Kakma is Kakma in FIG. 5.1-1 in the standard TS33.535 v16.0.0. For generation and storage of Kakma, reference may be made to a generation and storage process of Kakma in FIG. 5.1-1 in the standard S33.535 v16.1.0. When the key generation network element is a BSF network element, the root key is Ks. Ks is Ks in FIG. 4.3 in the standard TS33.220 v16.0.0. For generation and storage of Ks, reference may be made to a generation and storage process of Ks in FIG. 4.3 in the standard S33.220 v16.0.0. When the key generation network element is a key management network element, the root key is a key that is stored and pre-configured by the key management network element and that corresponds to the first terminal device. Allocation means that there is a key derivation process. The key generation network element may allocate the root key to the first terminal device by itself or obtain the key from another network element that participates in key allocation. For Kausf, the AUSF network element may generate Kausf by itself, or the UDM network element may send Kausf to the AUSF network element after generating Kausf. For Kakma, after generating Kakma, the AUSF network element may transfer Kakma to the AAnF network element. The key (such as Kausf, Kamf, Kakma, and Ks) allocated to the first terminal device may correspond to the identity of the first terminal device. That is, the allocated key may be determined by using the identity of the first terminal device. The pre-configured key (for example, a key stored in the key management network element) may correspond to the user identity of the first terminal device, that is, the pre-configured key may be determined by using the user identity.

It should be noted that, if the key generation network element is a key management network element, the first key obtaining request may not carry the identity of the first terminal device, but carry the user identity of the first terminal device. After receiving the first key obtaining request, the key management network element may determine, based on the user identity of the first terminal device, a key pre-configured for the first terminal device, where the pre-configured key may be used as a root key to obtain the discovery key at the terminal device granularity.

After determining the root key, the key generation network element may generate the discovery key at the terminal device granularity based on the root key.

The discovery key at the terminal device granularity=KDF (root key, another input parameter), where KDF is a key derivation function, and a root key in parameters used to generate the discovery key at the terminal device granularity is a mandatory parameter.

When generating the discovery key at the terminal device granularity, the key generation network element may alternatively add another input parameter. A type of the another input parameter is not limited in this embodiment of this application. The another input parameter may be a character string, for example, "5G ProSe", or may be a counter value. A quantity of other parameters is not limited in the application. There may be 0, 1, or more other parameters. For example, the discovery key at the terminal device granularity=KDF (root key, SUPI, "5G Prose"). In another example, the discovery key at the terminal device granularity=KDF (root key, "5G Prose", counter value). In another example, the discovery key at the terminal device granularity=KDF (root key, counter value).

After generating the discovery key at the terminal device granularity, the key generation network element may carry the discovery key at the terminal device granularity in the first key obtaining response, and send the first key obtaining response to the first network element. After receiving the discovery key at the terminal device granularity, the first network element may store the discovery key at the terminal device granularity.

In an embodiment, the key generation network element may further send, to the first network element, first parameters required for generating the discovery key at the terminal device granularity. The first parameters are some or all of input parameters other than the root key when the key generation network element generates the discovery key at the terminal device granularity. The first parameters may be parameters that are not stored or cannot be learned by a first network element side. For example, when the discovery key at the terminal device granularity is generated by using the counter value, the counter value is a parameter that cannot be learned by the first network element, and the key generation network element may send the counter value to the first network element.

It should be noted that, if the input parameters for generating the discovery key at the terminal granularity include some or all of the following: the identity of the first terminal device, the root key, and the character string, where such parameters can be learned or pre-stored by the first network element, and the key generation network element may not need to send the input parameters to the first network element.

After obtaining the discovery key at the terminal device granularity, the first network element may directly perform step 204, that is, send, to the first terminal device, the key generation parameter required for generating the discovery key at the terminal device granularity. The key generation parameters are some or all of other input parameters other than the root key when the key generation network element generates the discovery key at the terminal granularity. The key generation parameter may be a parameter that is not stored or cannot be learned by the first terminal device. For example, when the discovery key at the terminal granularity is generated by using the counter value, the counter value is a parameter that cannot be learned by the first terminal device, and the first network element may send the counter value as the key generation parameter to the first terminal device. In another example, the input parameters for generating the discovery key at the terminal granularity include some or all of the following: the identity of the first terminal device, the root key, and the character string, where the parameters can be learned or pre-stored by the first terminal device, and the first network element may not need to send the input parameters to the first terminal device.

Alternatively, after obtaining the discovery key at the terminal granularity, the first network element may generate the discovery key at the ProSe granularity based on the discovery key at the terminal device granularity, and then perform step 204.

The first network element may generate the discovery key at the ProSe granularity in the following manners.

The discovery key at the ProSe granularity=KDF (discovery key at terminal device granularity, another input parameter). When generating the discovery key at the ProSe granularity, the first network element may also add another input parameter. A type of the another input parameter is not limited in this embodiment of this application. The another input parameter may be a ProSe temporary identity. In addition to the ProSe temporary identity, a part of or all information of the ProSe information of the first terminal device may be used as the input parameter, or the input parameter may be another parameter in the ProSe parameter of the first terminal device, for example, a current time, a MAX offset, or the like. A quantity and types of other input parameters are not limited in this application.

After generating the discovery key at the ProSe granularity, the first network element may perform step 204, herein, the first network element feeds back, to the first terminal device, a key generation parameter required for generating the discovery key at the ProSe granularity. The key generation parameter herein includes another input parameter (that is, a parameter that is not stored or cannot be learned by the first network element, for example, a counter value) other than the root key when the key generation network element generates the discovery key at the terminal device granularity, and another input parameter, for example, a current time and a MAX offset other than the ProSe information of the first terminal device and the discovery key at the terminal device granularity when the first network element generates the discovery key at the ProSe granularity.

The first network element may further store the discovery key at the ProSe granularity. When storing the discovery key at the ProSe granularity, the first network element may further store a correspondence between a validity time of the ProSe temporary identity and the discovery key at the ProSe granularity, for example, store a validity timer of the ProSe temporary identity, where a validity time indicated by the validity timer corresponding to the ProSe temporary identity may also be used as a validity time of the discovery key at the ProSe granularity.

(2) the Discovery Key at the ProSe Granularity

The first network element sends a second key obtaining request to the key generation network element, where the second key obtaining request may include at least one of identity information (for example, at least one of the identity or the user identity of the first terminal device) and the ProSe temporary identity of the first terminal device, and in an embodiment, may further include a part of or all information of the ProSe information of the first terminal device and another parameter of the ProSe parameter of the first terminal device, for example, some or all of a current time, a MAX offset, and a validity timer.

After receiving the second key obtaining request, the key generation network element may determine the root key based on the identity information of the first terminal device. For descriptions of the root key, reference may be made to the foregoing descriptions. Details are not described herein again.

After determining the root key, the key generation network element may generate the discovery key at the ProSe granularity based on the root key.

The discovery key at the ProSe granularity=KDF (root key, another input parameter).

When generating the discovery key at the ProSe granularity, the key generation network element may also add another input parameter. A type of the another input parameter is not limited in this embodiment of this application. The another input parameter may be a ProSe temporary identity. In addition to the ProSe temporary identity, a part of or all information of the ProSe information of the first terminal device may be used as the another input parameter, or another parameter (for example, some or all of a current time, a MAX offset, and a validity timer) of the ProSe parameter of the first terminal device may be used as the another input parameter. Alternatively, the another input parameter may be an input parameter introduced for generating the discovery key at the terminal device granularity. The quantity and types of other input parameters are not limited in this embodiment of this application.

The key generation network element may further store the discovery key at the ProSe granularity. When storing the discovery key at the ProSe granularity, the key generation network element may further store a correspondence between a validity time of the ProSe temporary identity and the discovery key at the ProSe granularity, for example, store a validity timer of the ProSe temporary identity, where a validity time indicated by the validity timer corresponding to the ProSe temporary identity may also be used as a validity time of the discovery key at the ProSe granularity. The key generation network element may delete the discovery key at the ProSe granularity after the validity time expires.

After generating the discovery key at the ProSe granularity, the key generation network element may send a second key obtaining response to the first network element, where the second key obtaining response carries the discovery key at the ProSe granularity.

In an embodiment, the key generation network element may further send, to the first network element, second parameters required for generating the discovery key at the ProSe granularity. The second parameters may be some or all of other input parameters. The second parameters may be parameters that are not stored or cannot be learned by the first network element, for example, input parameters other than the ProSe information of the first terminal device, ProSe parameter of the first terminal device, and the root key.

After obtaining the discovery key at the ProSe granularity from the second key obtaining response, the first network element may perform step 204. Herein, the first network element feeds back, to the first terminal device, a key generation parameter required for generating the discovery key at the ProSe granularity.

The first network element may further store the discovery key at the ProSe granularity. When storing the discovery key at the ProSe granularity, the first network element may further store a correspondence between a validity time of the ProSe temporary identity and the discovery key at the ProSe granularity, for example, store a validity timer of the ProSe temporary identity, where a validity time indicated by the validity timer corresponding to the ProSe temporary identity may also be used as a validity time of the discovery key at the ProSe granularity.

Manner 2. The first network element generates the discovery key of the first terminal device by itself.

A manner in which the first network element generates the discovery key at the terminal device granularity or the discovery key at the ProSe granularity is the same as a manner in which the key generation network element generates the discovery key at the terminal device granularity or the discovery key at the ProSe granularity. A difference lies in different execution entities. For details, reference may be made to the foregoing descriptions.

It should be noted that, before generating the discovery key of the first terminal device by itself, the first network element may first determine the root key, where the root key may be locally stored by the first network element, or may be obtained by the first network element from another network element (for example, the key generation network element in the foregoing description) based on the identity and/or the user identity of the first terminal device.

It should be noted that, after obtaining the discovery key of the first terminal device (where the discovery key may be a key at the ProSe granularity or a key at the terminal device granularity), the first network element may further generate a subkey based on the discovery key of the first terminal device. The subkey includes at least one of an integrity protection subkey or a confidentiality protection subkey. Alternatively, the first network element may generate another subkey, for example, a scramble subkey, based on the discovery key of the first terminal device. The integrity protection subkey may be used on the first terminal device side to generate a message integrity code. The integrity protection subkey may further perform integrity protection on some parameters (for example, some or all of ProSe parameters) on the first terminal device side. The confidentiality protection subkey is used to provide confidentiality protection for all or some of messages (for example, a ProSe request message) of the first terminal device. Integrity protection protects integrity of data during transmission. Integrity means that the data is consistent with the original data and is not modified. Confidentiality protection is used to make attackers "unreadable". The scramble subkey is used to disrupt an original sequence of the messages to implement an interference function. As a result, a bit sequence of data transmitted over an air interface is disordered, which is different from a bit sequence of original data. This increases the difficulty for attackers to crack data. A manner in which the first network element generates the subkey based on the discovery key of the first terminal device and a type of the generated subkey are not limited in this embodiment of this application. For example, the subkey may be generated by using a key derivation function and the discovery key of the first terminal device. Both input parameters used when the discovery key at the terminal device granularity and the discovery key at the ProSe granularity are generated may be used as parameters for generating the subkey.

For example, subkey=KDF (discovery key of first terminal device, another input parameter). Other input parameters may vary based on the type of the generated subkey. For example, a character string is used as an input parameter. Integrity protection subkey=KDF (discovery key of first terminal device, "IK"), confidentiality protection subkey=KDF (discovery key of first terminal device, "CK"), and scramble subkey=KDF (a discovery key of the first terminal device, "SK"). In another example, a subkey type distinguisher is used for representation, that is, integrity protection subkey=KDF (discovery key of first terminal, 0×01), confidentiality protection subkey=KDF (discovery key of first terminal device, 0×02), and scramble subkey=KDF (discovery key of first terminal device, 0×03).

In another example, the first network element may also intercept a part of the discovery key of the first terminal device as the subkey. For example, if a length of the discovery key of the first terminal device is 256 bits (where the discovery key may be a key at the ProSe granularity or a key at the terminal device granularity), higher 128 bits may be used as an integrity protection subkey, and lower 128 bits may be used as a confidentiality protection subkey. In another example, if the length of the discovery key of the first terminal device is 512 bits (where the discovery key may be a key at the ProSe granularity or a key at the terminal device granularity), highest 128 bits may be used as an integrity protection subkey, 128 bits in the medium may be used as a confidentiality protection subkey, and lowest 128 bits may be used as a scramble subkey. Functions of the integrity protection subkey, the confidentiality protection subkey, and the scramble subkey are embodied in a process in which verification is performed between the first terminal device and the second terminal device. For details, reference may be made to subsequent content.

When the first network element performs step 204, the first network element may send, to the first terminal device, a key generation parameter required for generating the discovery key of the first terminal device. The key generation parameter is a parameter that is not stored or cannot be learned by the first terminal device, for example, a ProSe parameter (such as a ProSe temporary identity), a counter value, and the like that are used to generate the discovery key of the first terminal device.

It should be noted that, the parameter obtaining response includes a ProSe parameter, and the ProSe parameter used to generate the discovery key of the first terminal device, such as the ProSe temporary identity, the current time, and the MAX offset may be used as the key generation parameter. The ProSe temporary identity used for generating the discovery key of the first terminal device is used as an example. The ProSe temporary identity included in the parameter obtaining response has two identities. One is a parameter in the ProSe parameter, and the other is a parameter in the key generation parameter. To reduce signaling overheads, the parameter obtaining response needs to carry the ProSe temporary identity only once, so that the ProSe temporary identity used as the ProSe parameter and the key generation parameter can be sent to the first terminal device.

In this way, the first terminal device obtains, from the first network element, the key generation parameter required for generating the discovery key. For a case in which the discovery key at the ProSe granularity has a validity time, after determining that the locally stored discovery key at the ProSe granularity expires, the first network element may delete the discovery key at the ProSe granularity, or may update the discovery key at the ProSe granularity, notify the first terminal device of updating the discovery key at the ProSe granularity, and may send, to the first terminal device, a key generation parameter used to generate an updated discovery key at the ProSe granularity.

Only the discovery key at the ProSe granularity is used as an example. For the discovery key at the terminal device granularity, the first network element may also use a validity timer corresponding to one or more ProSe temporary identities as a validity timer of the discovery key at the terminal device granularity. After the discovery key at the terminal device granularity expires, the first network element may delete the discovery key at the terminal device granularity, or may update the discovery key at the terminal device granularity, notify the first terminal device of updating the discovery key at the terminal device granularity, and may send, to the first terminal device, a key generation parameter used to generate an updated discovery key at the terminal device granularity.

If the parameter obtaining response includes some or all of the following: a current time, a MAX offset, and a validity timer, that is, the parameter obtaining response may indicate a validity time of the ProSe temporary identity. The first terminal device may use the validity time of the ProSe temporary identity as a validity time of the discovery key at the ProSe granularity. After determining that the locally stored discovery key at the ProSe granularity expires, the first terminal device may delete the discovery key at the ProSe granularity.

In the description of the first part, a manner of obtaining the key generation parameter by the terminal device is described by using the first terminal device as an example. A manner of obtaining the key generation parameter by the second terminal device is similar to a manner of obtaining the key generation parameter by the first terminal device. Details are not described herein again.

In an implementation, after obtaining the discovery key at the terminal device granularity or the discovery key at the ProSe granularity or the subkey of the first terminal device, the first network element may directly send the discovery key at the terminal device granularity or the discovery key at the ProSe granularity or the subkey to the first terminal device. The first network element may further store the discovery key at the terminal device granularity or the discovery key at the ProSe granularity or the subkey. Further, after the first terminal device receives the discovery key at the terminal device granularity or the discovery key at the ProSe granularity sent by the first network element, this embodiment of this application does not limit whether the first terminal device directly uses the discovery key or further generates another key. For example, after the first terminal device receives the discovery key at the terminal device granularity sent by the first network element, the first terminal device may further generate the discovery key at the ProSe granularity. In another example, after the first terminal device receives the discovery key at the terminal device granularity sent by the first network element, the first terminal device may further generate the subkey. For example, the first terminal device may first generate the discovery key at the ProSe granularity, and then generate the subkey by using the discovery key at the ProSe granularity, or directly generate the subkey by using the discovery key at the terminal device granularity. Correspondingly, the first network element device may also obtain the subkey in a manner similar to that of the first terminal device. It should be noted, that the first network element also needs to send, to the first terminal device, a parameter required for generating the subkey.

Manner 2. Verification is performed between the first terminal device and the second terminal device. A manner of verifying the first terminal device by using the second terminal device as a provider of the proximity service is described. In actual application, the first terminal device may also verify the second terminal device in a similar manner.

Figure 3:
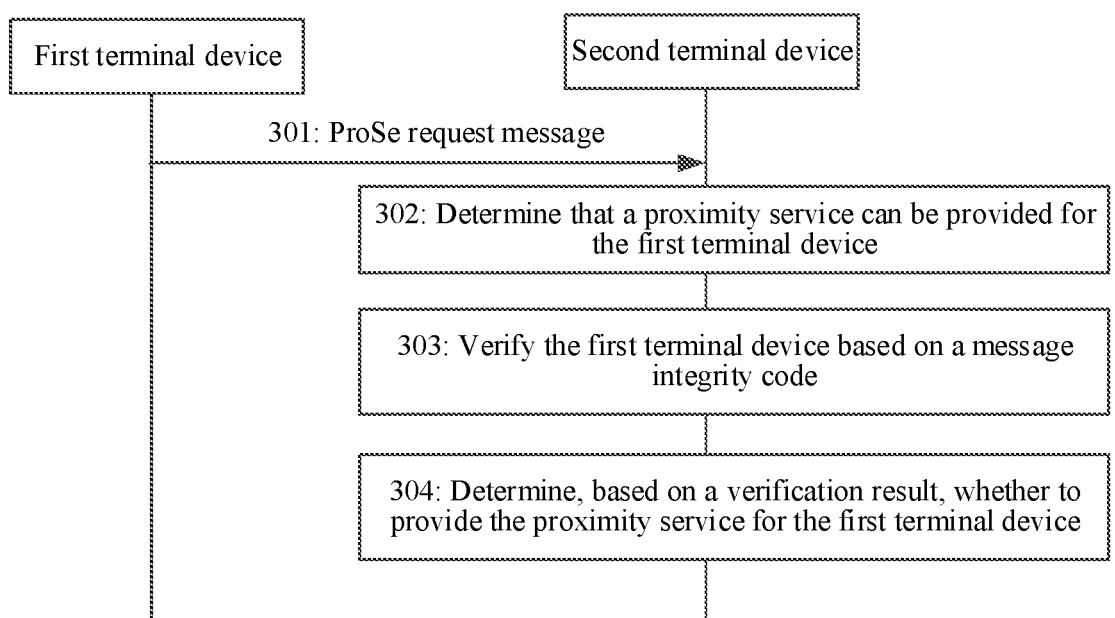
FIG. 3 is a schematic diagram of a method for performing verification between a first terminal device and a second terminal device according to this application.

FIG. 3 is a method for performing verification between terminal devices according to an embodiment of this application. The method includes the following steps.

Step 301: The first terminal device sends a ProSe request message, where the ProSe request message includes a ProSe temporary identity and a message integrity code of the first terminal device.

After obtaining a key generation parameter from the first network element, the first terminal device may generate a discovery key of the first terminal device based on the key generation parameter.

A manner in which the first terminal device generates the message integrity code based on the discovery key of the first terminal device is not limited in this embodiment of this application. For example, the first terminal device may directly generate the message integrity code based on the discovery key of the first terminal device, for example, message integrity code=KDF (discovery key of first terminal device, another parameter). The another parameter herein may be some or all of a ProSe temporary identity, a current time, and a MAX offset, or may be a parameter of another type. A quantity and types of the other parameters are not limited in this application. In another example, the first terminal device may generate a subkey based on the discovery key of the first terminal device, and then generate the message integrity code based on the subkey, for example, message integrity code=KDF (subkey, another parameter). The another parameter herein may be some or all of a ProSe temporary identity, a current time, and a MAX offset, or may be a parameter of another type. A quantity and types of the other parameters are not limited in this application.

In an embodiment, after generating the discovery key of the first terminal device, the first terminal device may further generate the subkey based on the discovery key of the first terminal device. A manner in which the first terminal device generates the subkey based on the discovery key of the first terminal device is similar to a manner in which the first network element generates the subkey based on the discovery key of the first terminal device. For details, reference may be made to the foregoing content. After generating the subkey, the first terminal device may perform integrity protection on the message integrity code by using the subkey. For example, if message integrity code=KDF (integrity protection subkey, another parameter), integrity protection is performed on the message integrity code. In an embodiment, the first terminal device may further encrypt, by using a confidentiality protection subkey, all information or a part of information carried in the ProSe request message, to implement confidentiality protection on the message integrity code.

In an embodiment, the first terminal device may further perform, by using a scramble subkey, interference on all information or a part of information carried in the ProSe request message, to implement interference protection.

Implementation and a quantity of times of performing integrity protection, confidentiality protection, and interference protection are not limited in this embodiment of this application. That is, only one of the protections may be performed, for example, only integrity protection, only confidentiality protection, or only interference protection is performed; or at least two of the protections may be performed, or all of the protections may be performed. In addition, a sequence of performing the protections is not limited in this embodiment of this application. That is, integrity protection may be first performed, confidentiality protection is performed on a part of or all of the information with integrity protection, and then interference protection is performed on the information with confidentiality protection. Alternatively, confidentiality protection may be first performed on all information or a part of information carried in the ProSe request message, integrity protection is performed on the information with confidentiality protection, and then interference protection is performed on the information with integrity protection.

Step 302: The second terminal device receives the ProSe request message, and determines, based on the ProSe temporary identity of the first terminal device included in the ProSe request message, that a proximity service can be provided for the first terminal device. The second terminal device may determine, based on the ProSe temporary identity, that the second terminal device can perform a ProSe communication with the first terminal device, that is, can support the proximity service.

Step 303: After determining that the second terminal device can provide the proximity service for the first terminal device, the second terminal device may verify the first terminal device based on the message integrity code.

The second terminal device may request the first network element to verify the first terminal device, or may verify the first terminal device by itself. The two manners are separately described below.

In a first manner, the second terminal device requests the first network element to verify the first terminal device.

The second terminal device may send a verification request to the first network element, where the verification request includes the ProSe temporary identity and the message integrity code of the first terminal device.

After receiving the verification request, the first network element may determine a stored discovery key of the first terminal device based on the ProSe temporary identity of the first terminal device.

The first network element generates an expected message integrity code based on the locally stored discovery key of the first terminal device in a same manner in which the first terminal device generates the message integrity code.

The first network element may compare the message integrity code with the expected message integrity code. If the message integrity code is consistent with the expected message integrity code, verification on the first terminal device succeeds; if the message integrity code is inconsistent with the expected message integrity code, verification on the first terminal device fails.

In an embodiment, if the first terminal device performs integrity protection on the message integrity code, after receiving the message integrity code on which integrity protection is performed, the first network element performs, by using an integrity protection subkey generated based on the discovery key of the first terminal device, integrity verification on the message integrity code on which integrity protection is performed, and after verification succeeds, compares the message integrity code with the expected message integrity code.

In an embodiment, if the first terminal device performs confidentiality protection on all information or a part of information carried in the ProSe request message, that is, encrypts all the information or a part of the information, after receiving all the encrypted information or a part of the encrypted information, the first network element first decrypts all the encrypted information or a part of the encrypted information by using a confidentiality protection subkey generated based on the discovery key of the first terminal device, and after decryption, compares the message integrity code with the expected message integrity code.

In another possible implementation, if the first terminal device performs confidentiality protection on all the information or a part of the information, after receiving all the encrypted information or a part of the encrypted information, the first network element first performs integrity protection verification on the message integrity code by using integrity protection subkey, and decrypts all the encrypted information or a part of the encrypted information after succeeding in comparing the message integrity code with the expected message integrity code.

The first network element sends a verification response to the second terminal device, where the verification response carries a result of verification performed by the first network element on the first terminal device. The verification result indicates that verification on the first terminal device succeeds or fails.

In a second manner, the second terminal device verifies the first terminal device by itself.

The second terminal device may obtain the discovery key of the first terminal device from the first network element. After or before receiving the ProSe request message of the first terminal device, the second terminal device may request a ProSe parameter of the second terminal device from a second network element in a manner similar to that in embodiment shown in FIG. 2.

A difference lies in that, after receiving a request message that is of the second terminal device and that is used to request the ProSe parameter, the second network element may first determine whether it is necessary to interact with the first network element. For example, the request message may carry related information of the first terminal device, for example, an application identity, an identity of the first terminal device, or the like. The related information of the first terminal device may be obtained by the second terminal device in advance, or may be obtained from the ProSe request message sent by the first terminal device. The second network element may determine, based on the related information of the first terminal device carried in the request message, that it is necessary to interact with the first network element. After determining that the second network element needs to interact with the first network element, the second network element may send, to the first network element, a parameter request that carries the related information of the first terminal device, where the parameter request is used to request a discovery key or a subkey of the first terminal device. The first network element associates with the first terminal device based on the information carried in the request message, determines a discovery key or a subkey of the first terminal device, and sends the discovery key of the first terminal device to the second network element. In addition to allocating a ProSe parameter to the second terminal device and sending, to the second terminal device, the ProSe parameter allocated to the second terminal device, the second network element may further the discovery key or the subkey of the first terminal device to the second terminal device. After the second terminal device receives the ProSe request message sent by the first terminal device, the second terminal device generates an expected message integrity code based on the discovery key or the subkey of the first terminal device obtained from the second network element in a same manner in which the first terminal device generates the message integrity code. The second terminal device may compare the message integrity code with the expected message integrity code. If the message integrity code is consistent with the expected message integrity code, verification on the first terminal device succeeds; if the message integrity code is inconsistent with the expected message integrity code, verification on the first terminal device fails. The first network element and the second network element may be the same or may be different.

It should be noted that, the discovery key or the subkey of the first terminal device may be generated by another network element (for example, a key generation network element), and the second network element obtains the discovery key of the first terminal device from the another network element.

Step 304: The second terminal device determines, based on the verification result, whether to provide the proximity service for the first terminal device, that is, determines whether to establish a direct communication with the first terminal device. The verification result indicates that the verification performed by the second terminal device on the first terminal device succeeds or fails.

If the second terminal device succeeds in verifying the first terminal device, the second terminal device may provide the proximity service for the first terminal device, and establish a direct communication with the first terminal device; if the second terminal device fails to verify the first terminal device, the second terminal device may reject to provide the proximity service for the first terminal device.

When the first terminal device verifies the second terminal device, the second terminal device generates a message integrity code 1 based on a discovery key of the second terminal device in a manner similar to that of the first terminal device, and carries the message integrity code 1 in a message return to the first terminal device.

The first terminal device may verify the second terminal device in a manner similar to that in step 303. If verification succeeds, the first terminal device receives the proximity service provided by the second terminal device and establishes a direct communication; otherwise, the first terminal device rejects the proximity service provided by the second terminal device and rejects to establish the direct communication. A generation manner in which the first terminal device generates an expected message integrity code 1 is the same as a method in which the second terminal device generates the message integrity code 1. For details, reference may be made to the foregoing content. Details are not described herein again.

Based on a system architecture shown in FIG. 1A and with reference to FIG. 4, a secure communication method provided in this embodiment of this application is further described below. The secure communication method provided in this embodiment of this application is described by using an example in FIG. 2 in which in an open ProSe discovery scenario, the first network element is a 5G DDNMF network element, the first terminal device is A-UE, the second terminal device is M-UE, A-UE interacts with an A-5G DDNMF network element through an A-AMF network element, and M-UE interacts with the A-5G DDNMF network element through an M-AMF network element. A-UE and M-UE may interact with the A-5G DDNMF network element through different AMF network elements, where the A-AMF network element and the M-AMF network element are used for distinguishing between the different AMF network elements. For a method for obtaining, by A-UE, a key generation parameter from the A-5G DDNMF network element, reference may be made to steps 401 to 409. For a method for verifying A-UE by M-UE, reference may be made to steps 410 to 414. The method includes the following steps.

Step 400: A-UE registers with a network, and performs authentication on a network side. For a primary authentication process, refer to clause 6.1 of TS 33.501.

In the primary authentication process, the AUSF network element obtains Kausf corresponding to A-UE from the UDM network element, or generates Kausf corresponding to A-UE by itself. The AUSF network element obtains and stores Kausf in the primary authentication process. UE network element obtains and stores Kausf in the primary authentication process.

Step 401: A-UE sends a parameter obtaining request to an A-AMF network element, where the parameter obtaining request is used to request a ProSe parameter of A-UE. The parameter obtaining request carries an identity of A-UE and ProSe information of A-UE. The identity of A-UE indicates A-UE. The ProSe information of A-UE indicates a proximity service required by A-UE. A-UE is an announcing UE in the open ProSe discovery scenario.

A specific type of the identity of A-UE is not limited in this embodiment of this application. The identity of A-UE may be an anonymous identity of A-UE, for example, an SUCI, or may be a temporary identity of A-UE, for example, a 5G-GUTI, or may be a subscription permanent identifier of A-UE, for example, an SUPI, a GPSI, or a PEI.

The ProSe information of A-UE may include a user identity, a discovery command, a discovery model, and a discovery type. For descriptions of the User Identity, discovery command, the discovery model, and the discovery type, reference may be made to the foregoing content. Details are not described herein again.

A quantity of user identities is not limited herein, and there may be one or more user identities. When there are a plurality of user identities, each user identity is identity information of A-UE in a ProSe scenario, and different user identities correspond to different proximity services.

Step 402: After receiving the parameter obtaining request, the A-AMF network element may send the parameter obtaining request to the A-5G DDNMF network element.

In an embodiment, the A-AMF network element may also parse the parameter obtaining request, to obtain information carried in the parameter obtaining request. For example, if determining that the parameter obtaining request carries the temporary identity or the anonymous identity of A-UE, the A-AMF network element may determine the subscription permanent identifier of A-UE based on the temporary identity or the anonymous identity of A-UE, update the temporary identity or the anonymous identity of A-UE in the parameter obtaining request to the subscription permanent identifier of A-UE, and then send the parameter obtaining request to the A-5G DDNMF network element.

A manner in which the A-AMF network element may determine the subscription permanent identifier of A-UE based on the temporary identity or the anonymous identity of A-UE is not limited in this embodiment of this application. For example, the A-AMF network element may store a correspondence between the temporary identity or the anonymous identity of A-UE and the subscription permanent identifier of A-UE, and the A-AMF network element may determine the subscription permanent identifier of A-UE based on the correspondence. In another example, the A-AMF network element may request to obtain the subscription permanent identifier of A-UE from a network element (for example, a UDM network element) that stores the correspondence between the temporary identity or the anonymous identity of A-UE and the subscription permanent identifier of A-UE.

If the A-AMF network element stores information of the AUSF network element that stores Kausf of A-UE, for example, an identity or an address of the AUSF network element. The A-AMF network element may further carry the information of the AUSF network element to the parameter obtaining request, and send the parameter obtaining request to the A-5G DDNMF network element.

Step 403: After receiving the parameter obtaining request, the A-5G DDNMF network element may perform an authorization check on A-UE based on the parameter obtaining request.

A manner in which the A-5G DDNMF network element performs the authorization check on A-UE based on the parameter obtaining request is not limited in this embodiment of this application. Two manners are described below.

Manner 1: The A-5G DDNMF network element requests the UDM network element or the ProSe application server to perform an authorization check.

For a manner in which the A-5G DDNMF network element requests the UDM network element or the ProSe application server to perform the authorization check, reference may be made to the manner in which the first network element requests another network element to perform the authorization check in the foregoing content. Details are not described herein again.

Manner 2: The A-5G DDNMF network element performs an authorization check by itself.

For a manner in which the A-5G DDNMF network element performs the authorization check by itself, reference may be made to the manner in which the first network element performs the authorization check by itself in the foregoing content. Details are not described herein again.

The A-5G DDNMF network element may send the identity of A-UE to the UDM network element, to request all subscription information of a proximity service of A-UE.

After receiving the identity and the user identity of A-UE, the UDM network element may determine, based on the identity of A-UE, all subscription information related to the proximity service (which may also be referred to as all subscription information of the proximity service) in the subscription information of A-UE, and the UDM network element sends all the subscription information of the proximity service to the A-5G DDNMF network element.

The A-5G DDNMF network element compares all the subscription information of the proximity service with the ProSe information of A-UE, for example, checks whether a discovery command and a discovery type that are consistent with a discovery command and a discovery type in the ProSe information exist in all the subscription information of the proximity service of A-UE.

If exists, the A-5G DDNMF network element determines that the authorization check on A-UE succeeds; if not exists, the A-5G DDNMF network element determines that the authorization check on A-UE fails, and the A-5G DDNMF network element does not allocate a ProSe parameter to A-UE.

If the parameter obtaining request includes a plurality of user identities, for each user identity, the A-5G DDNMF network element may perform an authorization check in Manner 1 or Manner 2.

Step 404: After the authorization check performed by the 5G DDNMF on A-UE succeeds, the 5G DDNMF allocates a ProSe parameter to A-UE, where the ProSe parameter includes a ProSe application code, and further includes some or all of the following: a current time, a MAX offset, and a validity timer.

Step 405: The A-5G DDNMF network element may send a key obtaining request to the AUSF network element, where the key obtaining request includes the identity of A-UE, and, in an embodiment, may further include a part of or all information of the ProSe parameter, and may include a part of or all information of the ProSe information of A-UE.

Before the A-5G DDNMF network element performs step 405, the A-5G DDNMF network element may first determine whether there is a need to request a key from the AUSF network element. If it is determined that there is a need, step 405 is performed. The A-5G DDNMF network element may determine, by determining the ProSe information, whether there is a need to request a key from the AUSF network element.

For example, the A-5G DDNMF network element determines a type of UE based on the discovery command in the ProSe information. If determining that A-UE is an announce UE, a response UE, or a query UE, the A-5G DDNMF network element needs to perform step 405.

In another example, if it is determined, based on the discovery command of the ProSe information, that the UE is a monitor UE, and then it is determined, based on the discovery model, that the UE is a model B, step 405 is determined to be performed.

Before performing step 405, the A-5G DDNMF network element may first determine whether a discovery key of A-UE is locally stored. If determining that the discovery key of A-UE is not stored, the A-5G DDNMF network element performs step 405. If determining that the discovery key of A-UE is stored, the A-5G DDNMF network element may obtain the locally stored discovery key of A-UE.

It should be noted that, a sequence of two operations in which the A-5G DDNMF network element allocates the ProSe parameter to A-UE and the A-5G DDNMF network element may send the key obtaining request to the AUSF network element is not limited in this embodiment of this application. For example, the A-5G DDNMF network element may first allocate the ProSe parameter to A-UE, and then send the key obtaining request to the AUSF network element. In this case, the key obtaining request may include a part of or all information of the ProSe parameter. In another example, the A-5G DDNMF network element may first send the key obtaining request to the AUSF network element, and then allocate the ProSe parameter to A-UE. In this case, the key obtaining request does not include a part of or all information of the ProSe parameter.

Step 406: After receiving the key obtaining request, the AUSF network element determines Kausf of A-UE based on the identity of A-UE, and calculates the discovery key of A-UE based on Kausf.

The following separately describes manners in which the AUSF network element calculates a discovery key at a UE granularity or a discovery key at a ProSe granularity of A-UE based on Kausf.

1. The AUSF network element calculates the discovery key at the ProSe granularity of A-UE based on Kausf.

The AUSF network element may generate the discovery key at the ProSe granularity of A-UE in the following two manners:

(1) The AUSF network element directly generates the discovery key at the ProSe granularity of A-UE based on Kausf.

For a manner in which the AUSF network element directly generates the discovery key at the ProSe granularity of A-UE based on Kausf, reference may be made to the manner in which the key generation network element generates the discovery key at the ProSe granularity of the first terminal device based on the root key in the foregoing description. Details are not described herein again.

(2) The AUSF network element first generates the discovery key at the UE granularity based on Kausf, and then generates the discovery key at the ProSe granularity of A-UE based on the key at the UE granularity.

For a manner in which the AUSF network element directly generates the discovery key at the UE granularity of A-UE based on Kausf, reference may be made to the manner in which the key generation network element generates the discovery key at the terminal device granularity based on the root key in the foregoing description. Details are not described herein again.

For a manner in which the AUSF network element generates the discovery key at the ProSe granularity of A-UE based on the key at the UE granularity, reference may be made to the foregoing description of the manner in which the first network element generates the discovery key at the ProSe granularity of the first terminal device based on the discovery key at the terminal device granularity. Details are not described herein again.

In an embodiment, the AUSF network element may set a life cycle for the discovery key of A-UE. For example, the validity timer is stored, and the validity timer is used as a generation cycle of the discovery key of UE. After the validity timer expires, the AUSF network element may delete the generated discovery key of A-UE.

2. The AUSF network element calculates the discovery key at the UE granularity of A-UE based on Kausf.

For a manner in which the AUSF network element calculates the discovery key at the UE granularity of A-UE based on Kausf, reference may be made to the foregoing descriptions. Details are not described herein again.

Step 407: The AUSF network element sends a key obtaining response to the A-5G DDNMF network element, where the key obtaining response includes the discovery key of A-UE. The discovery key of A-UE is a discovery key at the UE granularity of A-UE or a discovery key at the ProSe granularity of A-UE.

The AUSF network element may further send, to the A-5G DDNMF network element, a first parameter required for generating the discovery key of A-UE, where the first parameter is a parameter that is not stored or cannot be learned by the A-5G DDNMF network element.

If the discovery key of A-UE is a discovery key at the UE granularity of A-UE, the A-5G DDNMF network element may further generate the discovery key at the ProSe granularity of A-UE based on the discovery key at the UE granularity of A-UE.

A manner in which the A-5G DDNMF network element generates the discovery key at the ProSe granularity of A-UE based on the discovery key at the UE granularity of A-UE is similar to a manner in which the AUSF network element generates the discovery key at the ProSe granularity of A-UE based on the discovery key at the UE granularity of A-UE. For details, reference may be made to the foregoing content. Details are not described herein again.

In an embodiment, the A-5G DDNMF network element stores the discovery key at the UE granularity of A-UE or the discovery key at the ProSe granularity of A-UE together with the validity timer and the Prose application code as 5G Prose security context of A-UE. After the validity timer expires, the A-5G DDNMF network element deletes the discovery key at the UE granularity of A-UE or the discovery key at the ProSe granularity of A-UE. If the A-5G DDNMF network element stores both the discovery key at the UE granularity of A-UE and the discovery key at the ProSe granularity of A-UE, after the validity timer expires, the A-5G DDNMF network element deletes the discovery key at the ProSe granularity of A-UE, and continues to store the discovery key at the UE granularity of A-UE.

In an embodiment, the A-5G DDNMF network element may further determine one or more subkeys based on the discovery key of A-UE. For example, the 5G DDNMF network element may further generate, based on the discovery key of A-UE, a key CK used for confidentiality protection and a key IK used for integrity protection. Whether a subkey is generated by using the discovery key at the UE granularity or the discovery key at the ProSe granularity is not limited in this embodiment of this application.

A manner in which the A-5G DDNMF network element determines one or more subkeys based on the discovery key is not limited in this embodiment of this application. For example, the A-5G DDNMF network element may generate one or more subkeys by using a KDF, or may split the discovery key into one or more subkeys. The A-5G DDNMF network element uses a part of the discovery key to as CK, and uses a part of the discovery key to as IK. For example, a length of the discovery key of A-UE is 512 bits. The A-5G DDNMF network element may use a first 128-bit field as CK, and use a middle 128-bit field as IK. When the subkey is generated, A-UE may generate a message integrity code by using the subkey.

Table 1 shows a manner of storing the discovery key at the ProSe granularity of A-UE after the A-5G DDNMF network element receives the discovery key at the ProSe granularity of A-UE.

TABLE 1

| SUPI | ProSe application code-1 | user identity-1 | discovery key-1 | validity timer | current time, MAX offset |
|---|---|---|---|---|---|
|  | ProSe application code-2 | user identity-2 | discovery key-2 | validity timer | current time, MAX offset |

In Table 1, the SUPI represents one terminal device (that is, A-UE). ProSe application code-1 and ProSe application code-2 represent ProSe temporary identities corresponding to two different applications. The two different applications have different user identities and discovery keys. Therefore, discovery key-1 and discovery key-2 are discovery keys at different ProSe granularities of different proximity services. According to the manner in Table 1, when A-UE uses ProSe application code-1, A-UE generates the message integrity code based on discovery key-1. In Table 1, the A-5G DDNMF network element may further generate a subkey based on discovery key-1 and discovery key-2. This is not limited in this embodiment of this application.

Table 2 shows a manner of storing the discovery key at the UE granularity of A-UE and the discovery key at the ProSe granularity of A-UE after the A-5G DDNMF network element receives the discovery key at the UE granularity of A-UE.

TABLE 2

| SUPI | discovery key | ProSe application code-1 | user identity-1 | user identity-1 discovery key | validity timer | current time, MAX_offset |
|---|---|---|---|---|---|---|
|  |  | ProSe application code-2 | user identity-2 | user identity-2 discovery key | validity timer | current time, MAX_Offset |

45

In Table 2, the SUPI represents one terminal device (that is, A-UE), and the discovery key is a discovery key shared by all applications of A-UE. The discovery key is a discovery key at the UE granularity of A-UE, and user identity-1 discovery key and user identity-2 discovery key are discovery keys at ProSe granularities of different proximity services. According to the manner in Table 2, when A-UE uses ProSe application code-1, A-UE generates the message integrity code based on discovery key-1. Discovery key-1 and discovery key-2 in Table 2 may further generate a subkey. This is not limited in this embodiment of this application.

In another implementation, if Table 2 has only one discovery key, and does not have user identity-1 discovery key and user identity-2 discovery key, if indicates that the discovery key is shared by all applications.

Step 408: The A-5G DDNMF network element sends a parameter obtaining response through the A-AMF network element, where the reference obtaining response includes a key generation parameter, the key generation parameter is a parameter required by A-UE to generate a discovery key of A-UE, and the key generation parameter is a parameter that is not stored or cannot be learned by A-UE. For example, the key generation parameter may be a ProSe parameter used to generate the discovery key, for example, a ProSe application code.

Step 409: After receiving the parameter obtaining response, A-UE generates the discovery key of A-UE by using a method the same as that of the AUSF network element or the A-5G DDNMF network element.

In this way, A-UE obtains, from the A-5G DDNMF network element, the key generation parameter used to generate the discovery key of A-UE.

Step 410: When determining that a proximity service needs to be used, that is, a direct communication needs to be established with another UE, A-UE may send a ProSe request message, where the ProSe request message includes a ProSe application code and a message integrity code (MIC).

A-UE may generate the MIC based on the discovery key of A-UE. A manner in which A-UE generates the MIC based on the discovery key of A-UE is not limited in this embodiment of this application. The discovery key of A-UE may be a discovery key at the UE granularity of A-UE, or may be a discovery key at the ProSe granularity.

For example, MIC=KDF (discovery key of A-UE, another parameter). The another parameter may be at least one of a ProSe application code, a current time, or a MAX OFFset, or may be a ProSe request message.

In an embodiment, A-UE may determine a subkey based on the discovery key of A-UE, and generate the MIC by using the subkey. For example, A-UE generates an MIC based on an integrity protection subkey IK, and performs confidentiality protection on a part of or all of information in the ProSe request message by using a confidentiality protection subkey CK, or may perform confidentiality protection on all or some bits of the MIC by using the confidentiality protection subkey CK.

It should be noted that, there is no need to separately generate the MIC when CK and IK are available. In the case of integrity protection, a parameter with a same function as the MIC is generated. For example, the parameter may be a message authentication code (MAC). The MAC may replace the MIC and has the same function as the MIC.

Before sending the ProSe request message, if CK (that is,) is generated, A-UE may encrypt all information or a part of information in the ProSe request message, that is, perform confidentiality protection.

For example, A-UE may perform confidentiality protection only on sensitive data in the ProSe request message in a predetermined manner. The sensitive data on which confidentiality protection is performed can be specified in the standard.

For example, the standard specifies that confidentiality protection is performed only on data such as the current time. A-UE may perform confidentiality protection only on the current time.

In another example, the standard instructs to perform confidentiality protection on a part of information in the ProSe request message in a delivery manner of a network side. In this case, the network side (that is, the A-5G DDNMF network element) may generate a template, and send the template to A-UE together with the ProSe parameter. The confidentiality protection template indicates bit information on which confidentiality protection needs to be performed. The content of the confidentiality protection template can be random or fixed. Being random means that bit information on which confidentiality protection needs to be performed and that is indicated by each template is not necessarily the same. Being fixed means that bit information on which confidentiality protection needs to be performed and that is indicated by each template is the same. Certainly, the fixed confidentiality protection template is not unchanged, and an operator may change corresponding content at any time. Different fixed templates may also be used for different terminal devices. In this case, it may be understood that there is a correspondence between the confidentiality protection template and an identity or a service identity of A-UE. Content of the confidentiality protection template is, for example, confidentiality wave protection is performed on some random bits in the message, and there is no need to perform protection on other bits. A-UE encrypts the ProSe request message based on the template.

In another example, A-UE may generate a confidentiality protection template by itself, and perform confidentiality wave protection on a part of content of the message based on the content of the confidentiality protection template. When A-UE may generate the confidentiality protection template by itself, in step 410, the ProSe request message may carry the confidentiality template.

IK is used to perform integrity protection on all information or a part of information in the ProSe request message. A sequence of using IK and CK is not limited in the application. That is, all information or a part of information in the ProSe request message may be first encrypted by using CK to implement confidentiality protection, and then integrity protection is performed on all or a part of encrypted information. Alternatively, integrity protection may be first performed on all information or a part of information in the ProSe request message by using IK, and a part of or all of information on which integrity protection is performed may be encrypted by using IK, to implement confidentiality protection. Alternatively, a part of or all of information on which confidentiality protection is not performed may be encrypted by using IK, to implement confidentiality protection.

Step 411: M-UE receives the ProSe request message, and after determining, based on the ProSe application code included in the ProSe request message, that a proximity service can be provided for A-UE, sends a verification request to the A-5G DDNMF network element, where the verification request includes the ProSe application code and the MIC of A-UE.

In an actual application scenario, different UEs may interact with different 5G DDNMF network elements. In steps 401 to 109, the 5G DDNMF network element interacting with A-UE is an A-5G DDNMF network element, and the 5G DDNMF network element interacting with M-UE is an M-5G DDNMF network element. M-UE sends the verification request to the M-5G DDNMF network element through the M-AMF network element, and then the M-5G DDNMF network element sends the verification request to the A-5G DDNMF network element.

Step 412: After receiving the verification request, the A-5G DDNMF network element verifies A-UE based on the verification request. The A-5G DDNMF network element may determine the discovery key of A-UE based on the ProSe application code, and generate an expected MIC (XMIC) based on the discovery key of A-UE. A manner in which the A-5G DDNMF network element generates the XMIC based on the discovery key of A-UE is the same as the manner in which A-UE generates the MIC based on the discovery key of A-UE. After generating the XMIC, the A-5G DDNMF network element determines whether the XMIC is consistent with the MIC.

If the XMIC and the MIC are consistent, it indicates that the identity of A-UE is valid, and verification performed on A-UE succeeds. Otherwise, the identity of A-UE is invalid, and verification performed on A-UE fails.

If integrity protection and confidentiality protection are performed on an A-UE side, correspondingly, the A-5G DDNMF network element needs to perform integrity protection verification and a decryption operation. A sequence of performing operations by the A-5G DDNMF network element is reverse to that of A-UE. For example, if A-UE first performs confidentiality protection and then performs integrity protection, the A-5G DDNMF network element needs to first verify integrity protection and perform a decryption operation on the message after verification succeeds, to obtain original information. When performing a decryption operation, the A-5G DDNMF network element may correspondingly perform the decryption operation in a pre-agreed manner, or a manner of generating a confidentiality template by the A-5G DDNMF network element, or a manner of receiving a confidentiality template from A-UE.

Step 413: After succeeding in verifying A-UE, the A-5G DDNMF network element sends a verification success response to M-UE through the M-AMF network element.

Step 414: After receiving the verification success response, M-UE may provide a proximity service for A-UE, that is, establish a direct communication with A-UE.

In step 410 to step 414, the description is provided by using an example in which M-UE verifies the identity of A-UE. In actual application, A-UE may also verify an identity of M-UE. For example, M-UE may obtain a key generation parameter and a ProSe application code of M-UE from the 5G DDNMF network element in a manner similar to steps 401 to 409. Then, M-UE generates a discovery key of M-UE based on the key generation parameter, and further generates a corresponding MIC, and send the MIC to A-UE. A-UE may obtain the MIC from M-UE in a manner similar to steps 411 to 414, and send, to the 5G DDNMF network element, a verification request that carries the MIC.

The foregoing description is provided by using an example in which the key generation network element is an AUSF network element. In an embodiment, the key generation network element may alternatively be an AMF network element, and a corresponding root key is Kamf. A case in which the key generation network element is an AMF network element is similar to the case in which the key generation network element is an AUSF network element, and a difference lies in different execution entities and different root keys. For details, reference may be made to related descriptions of the embodiment shown in FIG. 4. Details are not described herein again. Alternatively, the key generation network element may be another network element, and a corresponding root key is a key that is related to A-UE and that is stored in the another network element. A case in which the key generation network element is another network element is similar to the case in which the key generation network element is an AUSF network element, and a difference lies in different execution entities and different root keys. For details, reference may be made to related descriptions of the embodiment shown in FIG. 4. Details are not described herein again.

Figure 4:
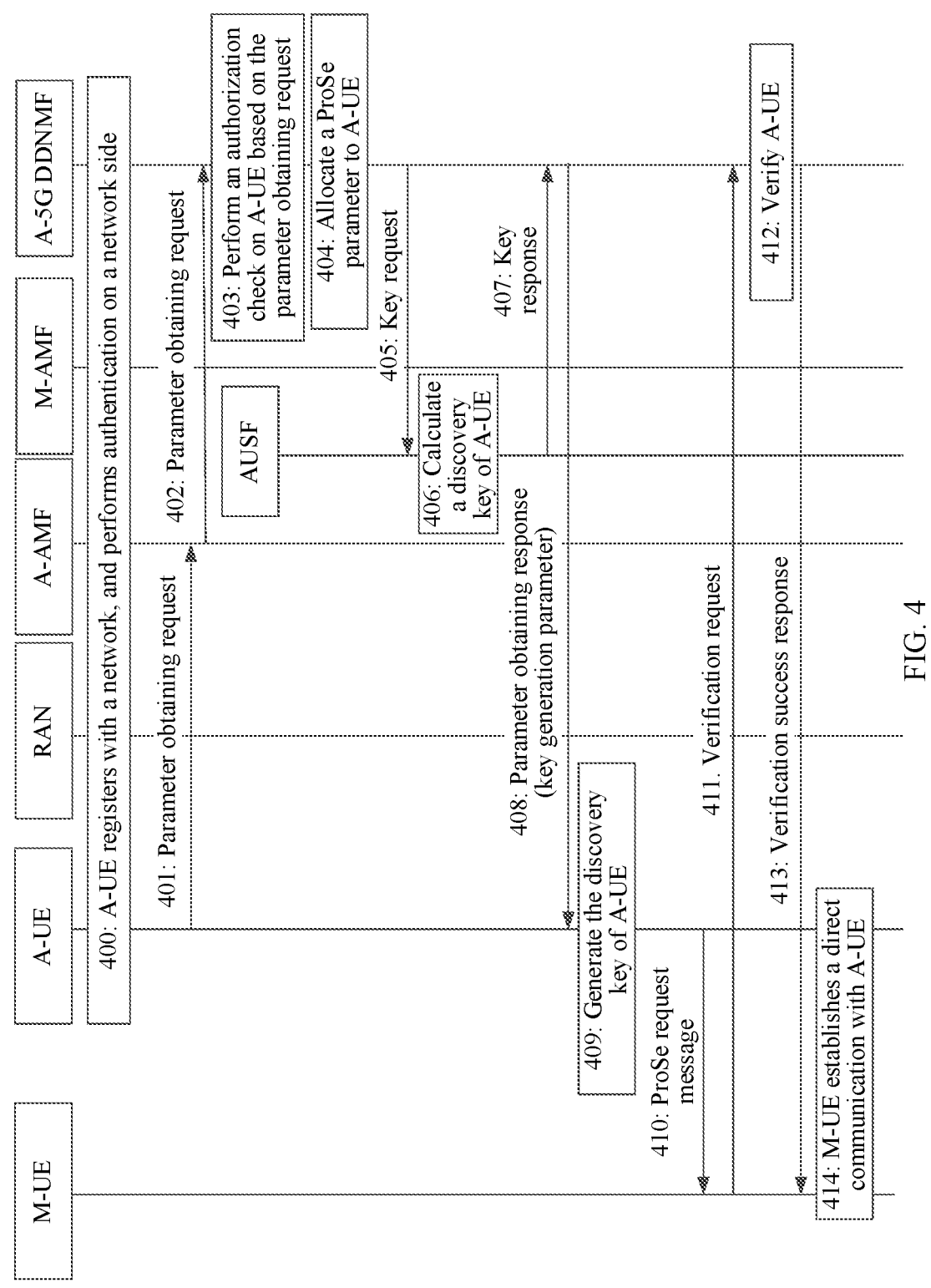
FIG. 4 is a schematic diagram of a secure communication method according to this application.
Figure 5:
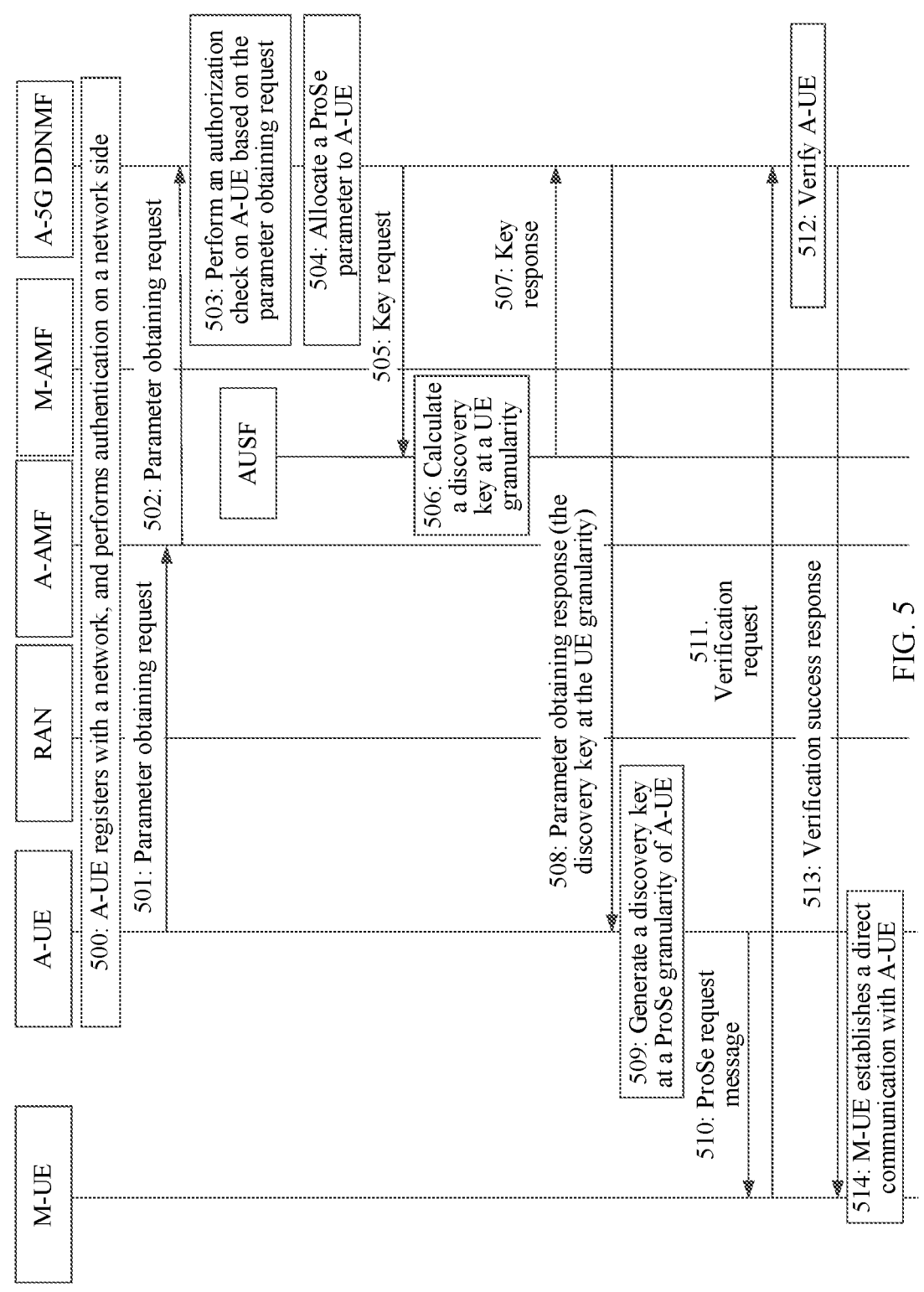
FIG. 5 is a schematic diagram of a secure communication method according to this application.
Figure 6:
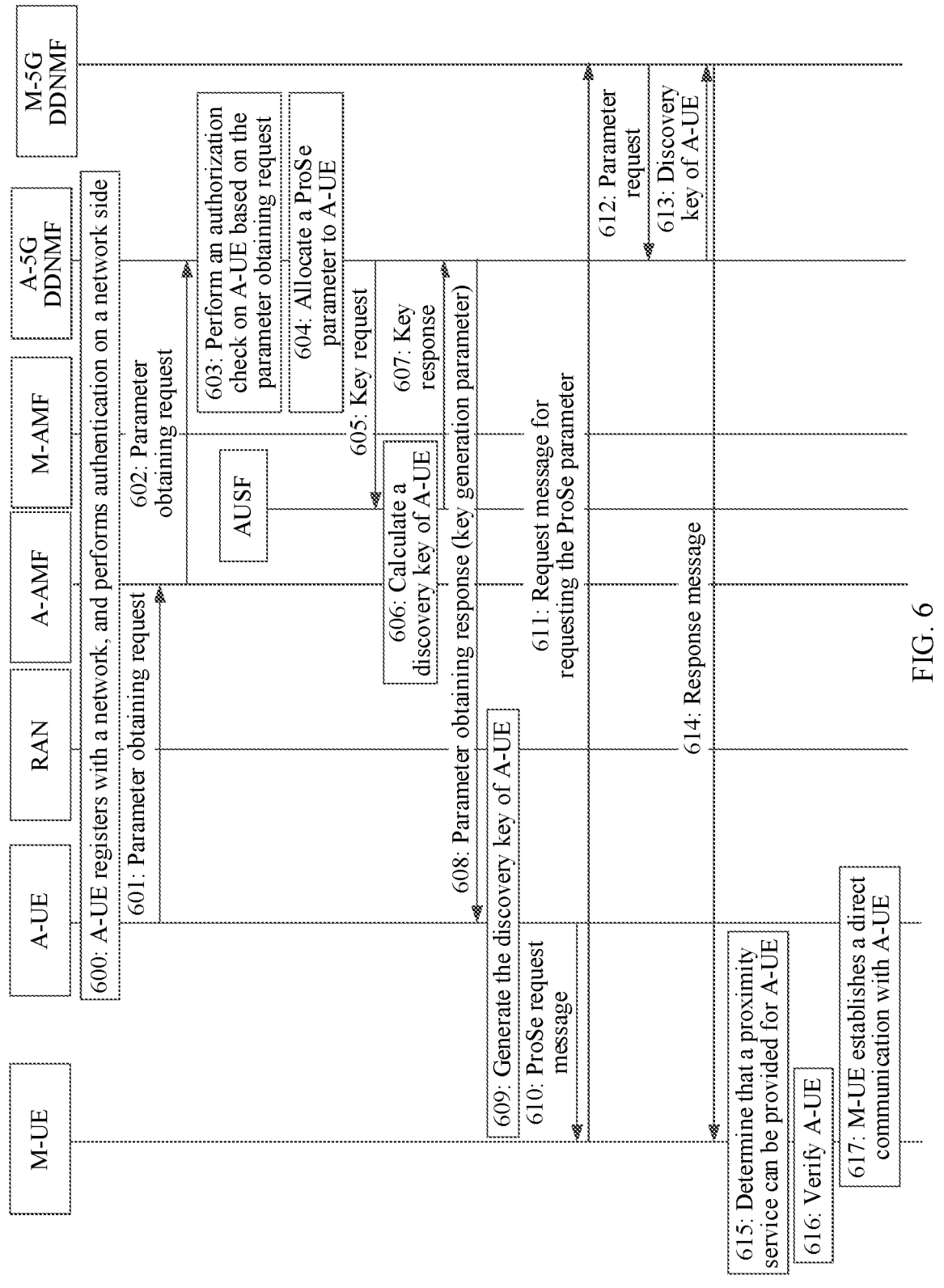
FIG. 6 is a schematic diagram of a secure communication method according to this application.

In the embodiment shown in FIG. 4, A-5G DDNMF may send a key generation parameter to A-UE, so that A-UE generates a discovery key of A-UE based on the key generation parameter. Then, during verification on A-UE, M-UE may perform verification through A-5G DDNMF. In an embodiment, the A-5G DDNMF may send the discovery key at the UE granularity of A-UE to A-UE, so that A-UE generates the discovery key at the ProSe granularity of A-UE based on the discovery key of A-UE, to further generate the MIC. Then, during verification on A-UE, M-UE may perform verification through A-5G DDNMF. The manner is described below. Refer to FIG. 5. A secure communication method provided in this embodiment of this application is further described below. The secure communication method provided in this embodiment of this application is described by using an example in FIG. 5 in which in an open ProSe discovery scenario, the first network element is a 5G DDNMF network element, the first terminal device is A-UE, the second terminal device is M-UE, A-UE interacts with an A-5G DDNMF network element through an A-AMF network element, and M-UE interacts with the A-5G DDNMF network element through an M-AMF network element. A-UE and M-UE may interact with the A-5G DDNMF network element through different AMF network elements, where the A-AMF network element and the M-AMF network element are used for distinguishing between the different AMF network elements. For a method for obtaining, by A-UE, a key generation parameter from the A-5G DDNMF network element, reference may be made to steps 501 to 509. For a method for verifying A-UE by M-UE, reference may be made to steps 510 to 514. The method includes the following steps.

Step 500 is the same as step 400. For details, reference may be made to the related description of step 400. Details are not described herein again.

Step 501 is the same as step 401. For details, reference may be made to the related description of step 401. Details are not described herein again.

Step 502 is the same as step 402. For details, reference may be made to the related description of step 402. Details are not described herein again.

Step 503 is the same as step 403. For details, reference may be made to the related description of step 403. Details are not described herein again.

Step 504 is the same as step 404. For details, reference may be made to the related description of step 404. Details are not described herein again.

Step 505 is the same as step 405. For details, reference may be made to the related description of step 405. Details are not described herein again.

Step 506: After receiving the key obtaining request, the AUSF network element determines Kausf of A-UE based on the identity of A-UE, and calculates the discovery key at the UE granularity of A-UE based on Kausf.

In an embodiment, the AUSF network element may generate the discovery key at the ProSe granularity of A-UE based on the discovery key at the UE granularity of A-UE. The AUSF network element calculates the discovery key at the UE granularity of A-UE based on Kausf. Then, for a manner of generating the discovery key at the ProSe granularity of A-UE based on the discovery key at the UE granularity of A-UE, reference may be made to the related descriptions in step 406. Details are not described herein again.

Step 507: The AUSF network element sends a key obtaining response to the A-5G DDNMF network element, where the key obtaining response includes the discovery key at the UE granularity of A-UE, and, in an embodiment, further includes the discovery key at the ProSe granularity of A-UE.

If the key obtaining response includes only the discovery key at the UE granularity of A-UE, the A-5G DDNMF network element may further generate the discovery key at the ProSe granularity of A-UE based on the discovery key at the UE granularity of A-UE.

A manner in which the A-5G DDNMF network element generates the discovery key at the ProSe granularity of A-UE based on the discovery key at the UE granularity of A-UE is similar to a manner in which the AUSF network element generates the discovery key at the ProSe granularity of A-UE based on the discovery key at the UE granularity of A-UE. For details, reference may be made to the foregoing content. Details are not described herein again.

If the key obtaining response includes only the discovery key at the UE granularity of A-UE, the A-5G DDNMF network element may further generate the discovery key at the ProSe granularity of A-UE based on the discovery key at the UE granularity of A-UE. The A-5G DDNMF network element may further generate a subkey of A-UE based on the discovery key at the ProSe granularity of A-UE.

A manner in which the A-5G DDNMF network element may further generate the subkey of A-UE based on the discovery key at the ProSe granularity of A-UE is similar to a manner in which the AUSF network element generates the discovery key at the ProSe granularity of A-UE based on the discovery key at the UE granularity of A-UE. For details, reference may be made to the foregoing content. Details are not described herein again.

If the key obtaining response includes only the discovery key at the UE granularity of A-UE, the A-5G DDNMF network element may not generate the discovery key at the ProSe granularity of A-UE. Instead, the A-5G DDNMF network element directly generates the subkey of A-UE based on the discovery key at the UE granularity.

A manner in which the A-5G DDNMF network element may further generate the subkey of A-UE based on the discovery key at the ProSe granularity of A-UE is similar to a manner in which the AUSF network element generates the discovery key at the ProSe granularity of A-UE based on the discovery key at the UE granularity of A-UE. For details, reference may be made to the foregoing content. Details are not described herein again.

In an embodiment, for a manner in which the A-5G DDNMF network element stores the discovery key at the UE granularity of A-UE and/or the discovery key at the ProSe granularity of A-UE, reference may be made to the related descriptions in step 407. Details are not described herein again.

Step 508: The A-5G DDNMF network element sends a parameter obtaining response through the A-AMF network element, where the reference obtaining response includes the discovery key at the UE granularity of A-UE and the ProSe parameter such as the ProSe application code.

Step 509: After receiving the parameter obtaining response, A-UE generates the discovery key at the ProSe granularity of A-UE by using a method the same as that of the AUSF network element or the A-5G DDNMF network element. In an embodiment, A-UE further generates the subkey of A-UE by using a method the same as that of the AUSF network element or the A-5G DDNMF network element.

In an embodiment, in another implementation method, after receiving the parameter obtaining response, A-UE generates the subkey of A-UE by using a method the same as that of the AUSF network element or the A-5G DDNMF network element.

It should be noted that, in step 508, an example in which the parameter obtaining response includes the discovery key at the UE granularity of A-UE is used. In an embodiment, the parameter obtaining response may not include the discovery key at the UE granularity of A-UE, but carry the discovery key at the ProSe granularity of A-UE or the subkey, where the subkey may be generated based on the discovery key at the UE granularity of A-UE, or may be generated based on the discovery key at the ProSe granularity of A-UE.

If the parameter obtaining response carries the discovery key at the ProSe granularity of A-UE, in step 509, when A-UE receives the parameter obtaining response, A-UE may generate the subkey based on the discovery key at the ProSe granularity of A-UE.

In this way, A-UE obtains, from the A-5G DDNMF network element, the discovery key used to generate the ProSe granularity of A-UE and/or the subkey, and the ProSe parameter.

Step 510: When determining that a proximity service needs to be used, that is, a direct communication needs to be established with another UE, A-UE may send a ProSe request message, where the ProSe request message includes a ProSe application code and an MIC.

The MIC is generated based on the discovery key of A-UE. For example, when A-UE receives the discovery key at the UE granularity of A-UE carried in the parameter obtaining response, A-UE may directly generate the MIC based on the discovery key at the UE granularity. Alternatively, A-UE may first generate a subkey based on the discovery key at the UE granularity, and then generate the MIC based on the subkey.

In another example, A-UE obtains a discovery key at the ProSe granularity of A-UE (where the discovery key at the ProSe granularity of A-UE may be carried in the parameter obtaining response, or may be generated by A-UE based on the discovery key at the UE granularity carried in the parameter obtaining response), A-UE may directly generate the MIC based on the discovery key at the ProSe granularity, or may first generate a subkey based on the discovery key at the ProSe granularity, and then generate the MIC based on the subkey.

In another example, A-UE receives the subkey carried in the parameter obtaining response, and A-UE may generate the MIC based on the subkey.

Step 511 is the same as step 411. For details, reference may be made to the related description of step 411. Details are not described herein again.

Step 512: After receiving a verification request, A-5G DDNMF may determine a discovery key (such as a discovery key at the UE granularity or a discovery key at the ProSe granularity) or a subkey of A-UE based on the Prose application code, and generate an expected MIC (XMIC) based on the discovery key of A-UE. A manner in which A-5G DDNMF generates the XMIC based on the discovery key of A-UE is the same as the manner in which A-UE generates the MIC based on the discovery key of A-UE. After generating the XMIC, A-5G DDNMF determines whether the XMIC is consistent with the MIC.

If the XMIC and the MIC are consistent, it indicates that the identity of A-UE is valid, and verification performed on A-UE succeeds. Otherwise, the identity of A-UE is invalid, and verification performed on A-UE fails.

Step 513 is the same as step 413. For details, reference may be made to the related description of step 413. Details are not described herein again.

Step 514 is the same as step 414. For details, reference may be made to the related description of step 414. Details are not described herein again.

In step 510 to step 514, the description is provided by using an example in which M-UE verifies the identity of A-UE. In actual application, A-UE may also verify an identity of M-UE. For example, M-UE may obtain a discovery key at the UE granularity M-UE and a ProSe application code of M-UE from 5G DDNMF in a manner similar to steps 501 to 514. Then, M-UE generates a discovery key at the ProSe granularity of M-UE based on the discovery key at the ProSe granularity of M-UE, and further generates a corresponding MIC, and send the MIC to A-UE. A-UE may obtain the MIC from M-UE in a manner similar to steps 511 to 514, and send, to 5G DDNMF, a verification request that carries the MIC.

In the embodiments shown in FIG. 4 and FIG. 5, when verifying A-UE, M-UE performs verification through the A-5G DDNMF. In actual application, M-UE may also perform verification on A-UE by itself.

Based on a system architecture shown in FIG. 1A and with reference to FIG. 5, a secure communication method provided in this embodiment of this application is further described below. The secure communication method provided in this embodiment of this application is described by using an example in FIG. 6 in which in an open ProSe discovery scenario, the first network element is a 5G DDNMF network element, the first terminal device is A-UE, the second terminal device is M-UE, A-UE interacts with an A-5G DDNMF network element through an A-AMF network element, and M-UE interacts with the A-5G DDNMF network element through an M-AMF network element. A-UE and M-UE may interact with the A-5G DDNMF network element through different AMF network elements, where the A-AMF network element and the M-AMF network element are used for distinguishing between the different AMF network elements. For a method for obtaining, by A-UE, a key generation parameter from the A-5G DDNMF network element, reference may be made to steps 601 to 609. For a method for verifying A-UE by M-UE, reference may be made to steps 610 to 614. The method includes the following steps.

Step 600 is the same as step 400. For details, reference may be made to the related description of step 400. Details are not described herein again.

Step 601 is the same as step 401. For details, reference may be made to the related description of step 401. Details are not described herein again.

Step 602 is the same as step 402. For details, reference may be made to the related description of step 402. Details are not described herein again.

Step 603 is the same as step 403. For details, reference may be made to the related description of step 403. Details are not described herein again.

Step 604 is the same as step 404. For details, reference may be made to the related description of step 404. Details are not described herein again.

Step 605 is the same as step 405. For details, reference may be made to the related description of step 405. Details are not described herein again.

Step 606 is the same as step 406. For details, reference may be made to the related description of step 406. Details are not described herein again.

Step 607 is the same as step 407. For details, reference may be made to the related description of step 407. Details are not described herein again.

Step 608 is the same as step 408. For details, reference may be made to the related description of step 408. Details are not described herein again.

Step 609 is the same as step 409. For details, reference may be made to the related description of step 409. Details are not described herein again.

Step 610 is the same as step 410. For details, reference may be made to the related description of step 410. Details are not described herein again.

Step 611: M-UE sends, to the M-5G DDNMF network element through the M-AMF network element, a request message used to request a ProSe parameter, where the request message carries related information of A-UE, for example, an identity of A-UE or a ProSe application code.

Step 612: The M-5G DDNMF network element allocates the ProSe parameter to M-UE, and sends a parameter request to the A-5G DDNMF network element, where the parameter request includes related information of A-UE, and the parameter request is used to request a discovery key of A-UE.

Step 613: After receiving the parameter request, the A-5G DDNMF network element determines the discovery key of A-UE based on the related information of A-UE, and feeds back the discovery key of A-UE to the M-5G DDNMF network element.

Step 614: The M-5G DDNMF network element sends a response message to M-UE, where the response message includes the ProSe parameter of M-UE and the discovery key of A-UE.

Step 615: M-UE receives a ProSe request message, and determines, based on the ProSe application code included in the ProSe request message and the ProSe parameter of M-UE, that a proximity service can be provided for A-UE.

Step 616: M-UE verifies A-UE. M-UE may generate an XMIC based on the discovery key of A-UE. A manner in which M-UE generates the XMIC based on the discovery key of A-UE is the same as the manner in which A-UE generates the MIC based on the discovery key of A-UE. After generating the XMIC, M-UE determines whether the XMIC is consistent with the MIC.

If the XMIC and the MIC are consistent, it indicates that the identity of A-UE is valid, and verification performed on A-UE succeeds. Otherwise, the identity of A-UE is invalid, and verification performed on A-UE fails.

Step 617: After succeeding in verifying A-UE, M-UE may provide a proximity service for A-UE, that is, establish a direct communication with A-UE.

It should be noted that, step 610 may also be performed after step 614. To be specific, M-UE may first request the ProSe parameter from the M-5G DDNMF network element, and request the discovery key of A-UE from the A-5G DDNMF network element. In this case, the related information of A-UE carried in the request message sent by M-UE may be obtained by M-UE in advance, for example, the related information may be an application identity and/or an identity of A-UE.

In step 610 to step 617, the description is provided by using an example in which M-UE verifies the identity of A-UE. In actual application, A-UE may also verify an identity of M-UE. For example, M-UE may obtain a key generation parameter from 5G DDNMF in a manner similar to steps 601 to 614. Then, M-UE generates a discovery key at the ProSe granularity of M-UE based on the key generation parameter, and further generates a corresponding MIC, and send the MIC to A-UE. A-UE may obtain the MIC from M-UE in a manner similar to steps 611 to 617, and obtain the discovery key of M-UE from 5G DDNMF, to generate an XMIC, and verify M-UE.

Figure 7:
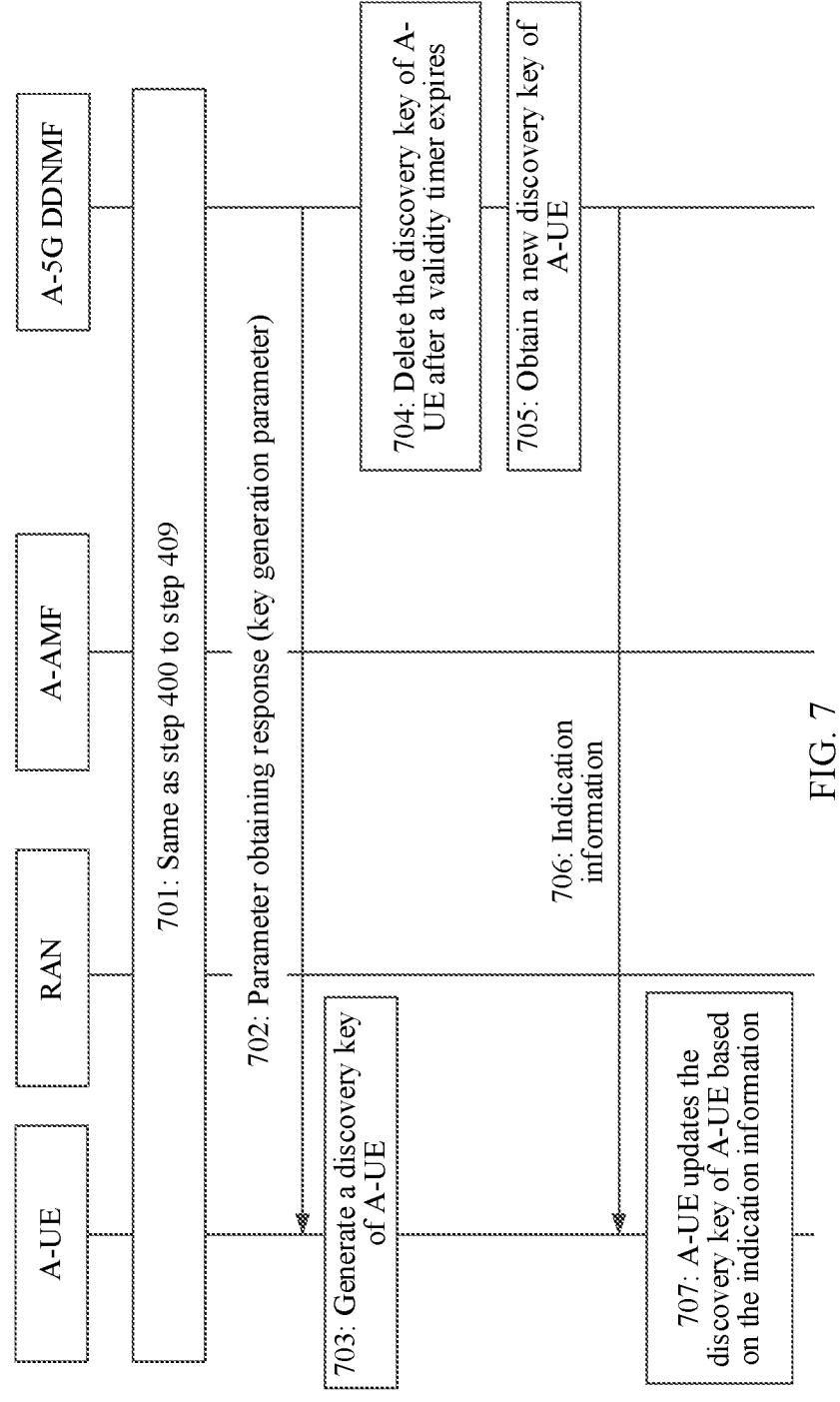
FIG. 7 is a schematic diagram of a secure communication method according to this application.

To ensure security of the discovery key of A-UE, 5G DDNMF or the AUSF network element (that is, the key generation network element) may set a life cycle for the discovery key of A-UE, where the life cycle may be sent to A-UE, or may not be sent to A-UE. Descriptions are provided below with reference to FIG. 7. Referring to FIG. 7, the method includes the following steps.

Step 701 is the same as step 400 to step 409. For details, reference may be made to the related descriptions of step 400 to step 407. Details are not described herein again.

Step 702 is the same as step 408. For details, reference may be made to the related description of step 408. Details are not described herein again. The parameter obtaining response may further include a validity timer that indicates a validity time of the discovery key of A-UE.

Step 703 is the same as step 409. For details, reference may be made to the related description of step 409. Details are not described herein again.

Step 704: The A-5G DDNMF network element deletes the discovery key of A-UE after the validity timer expires.

The A-5G DDNMF network element stores the discovery key at the UE granularity of A-UE or the discovery key at the ProSe granularity of A-UE together with the validity timer and the Prose application code as 5G Prose security context of A-UE. After the validity timer expires, the A-5G DDNMF network element may delete the discovery key at the UE granularity of A-UE or the discovery key at the ProSe granularity of A-UE. If the A-5G DDNMF network element stores both the discovery key at the UE granularity of A-UE and the discovery key at the ProSe granularity of A-UE, after the validity timer expires, the A-5G DDNMF network element deletes the discovery key at the ProSe granularity of A-UE, and continues to store the discovery key at the UE granularity of A-UE.

Step 705: The A-5G DDNMF network element obtains a new discovery key of A-UE, and the A-5G DDNMF network element may request the new discovery key of A-UE from the AUSF network element, or may generate the discovery key of A-UE by itself.

Step 706: The A-5G DDNMF network element sends instruction information to A-UE, where the indication information indicates updating of a newer discovery key of A-UE. A manner in which the indication information indicates updating of the discovery key of A-UE is not limited in this embodiment of this application. An explicit instruction manner may be used, for example, a pre-agreed identity or character may be used to instruct to update the discovery key of A-UE. Alternatively, an implicit instruction manner may be used, for example, a key generation parameter used to generate a new discovery key of A-UE may be carried for instruction.

If the explicit indication manner is used, the indication information may further carry the key generation parameter used to generate the new discovery key of A-UE.

Step 707: After receiving the indication information, A-UE updates the discovery key of A-UE based on the indication information.

If the indication information includes the key generation parameter used to generate the new discovery key of A-UE, A-UE generates the new discovery key of A-UE based on the key generation parameter. If the indication information does not include the key generation parameter used to generate the new discovery key of A-UE, A-UE may send a parameter obtaining request to the A-5G DDNMF network element again.

It should be noted that, if A-UE obtains a validity timer, A-UE may initiate a plurality of ProSe parameter request procedures before the validity timer expires, but does not need to update the discovery key. When the validity timer expires, A-UE may delete the discovery key, or may send the parameter obtaining request to the A-5G DDNMF network element again.

Figures 8, 9, 10, 11, 12:
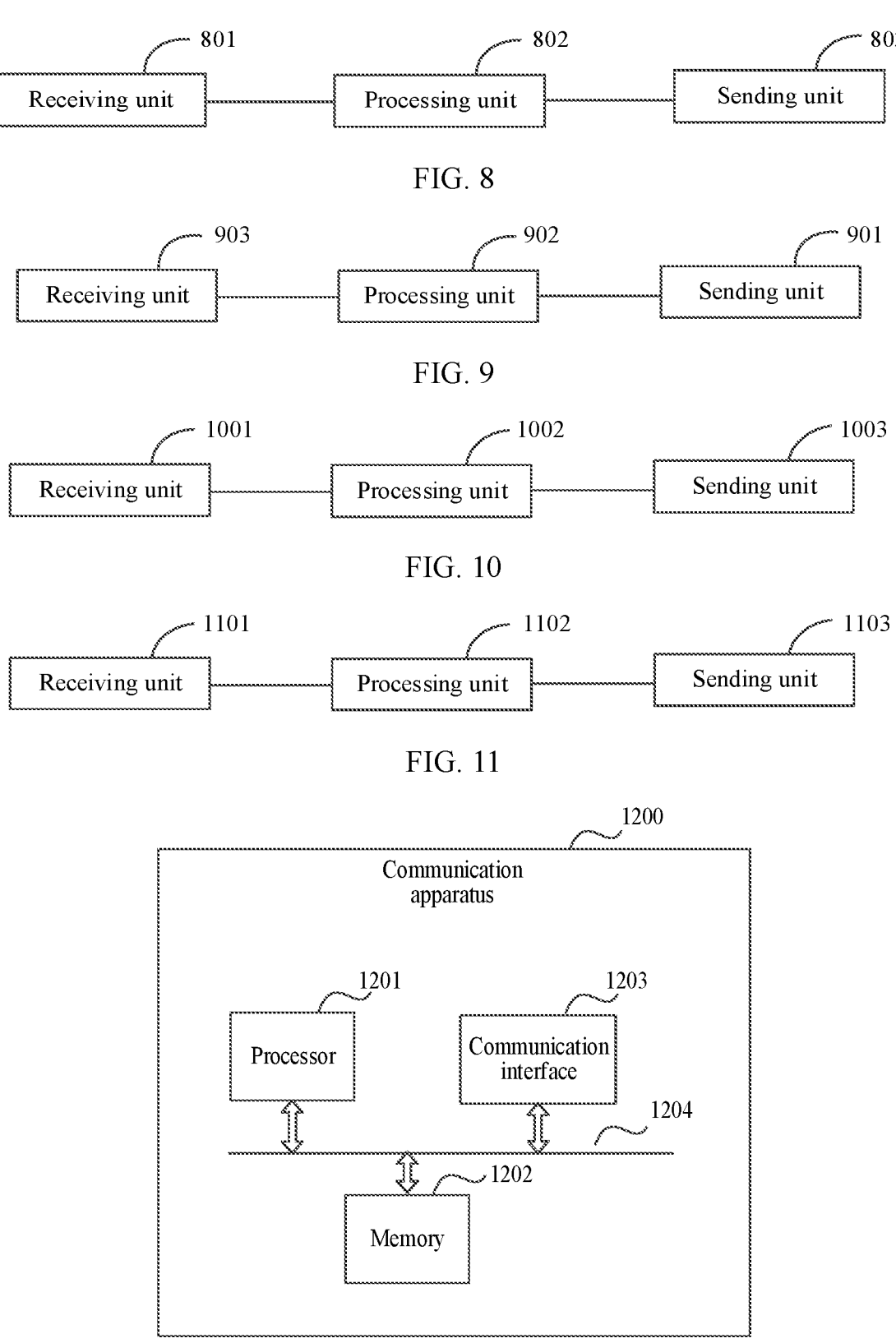
FIG. 8 to FIG. 13 are schematic diagrams of a structure of a communication apparatus according to an embodiment of this application.

Based on a same inventive concept as that of the method embodiments, an embodiment of this application further provides a communication apparatus, configured to perform the method performed by the first terminal device or A-UE in the foregoing method embodiments. For related features, reference may be made to the foregoing method embodiments. Details are not described n again. As shown in FIG. 8, the apparatus includes a receiving unit 801, a processing unit 802, and a sending unit 803.

The receiving unit 801 is configured to obtain a key generation parameter, where the key generation parameter includes a ProSe temporary identity of the first terminal device.

The processing unit 802 is configured to: generate a first discovery key based on a root key and the key generation parameter; and generate a message integrity code based on the first discovery key.

The sending unit 803 is configured to send a ProSe request message, where the ProSe request message includes the ProSe temporary identity and the message integrity code.

In an embodiment, the sending unit 803 may further send a parameter obtaining request to a first network element, where the parameter obtaining request includes an identity of the first terminal device. The receiving unit 801 receives a parameter obtaining response from the first network element, where the parameter obtaining response includes the key generation parameter.

In an embodiment, when generating the message integrity code based on the discovery key, the processing unit 802 may first generate a subkey based on the discovery key, and then generate the message integrity code based on the subkey. Alternatively, the processing unit may directly generate the message integrity code based on the discovery key.

In an embodiment, the key generation parameter further includes some or all of the ProSe parameters except the ProSe temporary identity that are allocated by the first network element to the first terminal device, for example, some or all of a current time and a MAX offset. In an embodiment, the key generation parameter may further include another parameter, for example, a counter value.

In an embodiment, the parameter obtaining response further includes a validity time of the ProSe temporary identity.

In an embodiment, the processing unit 802 may further store the first discovery key and the validity time.

In an embodiment, the processing unit 802 may further delete the first discovery key after the validity time expires.

In an embodiment, the root key may be any one of the following: Kausf, Kamf, Kakma, or a pre-configured key.

Based on a same inventive concept as that of the method embodiments, an embodiment of this application further provides a communication apparatus, configured to perform the method performed by the first network element or A-5G DDNMF network element in the foregoing method embodiments. For related features, reference may be made to the foregoing method embodiments. Details are not described herein again. As shown in FIG. 9, the apparatus includes a sending unit 901, a processing unit 902, and a receiving unit 903.

The sending unit 901 is configured to send a key generation parameter, where the key generation parameter includes a ProSe temporary identity of the first terminal device.

The receiving unit 903 is configured to receive a verification request from a second terminal device, where the verification request includes a ProSe temporary identity and a message integrity code.

The processing unit 902 is configured to: determine a first discovery key of the first terminal device based on the ProSe temporary identity, generate an expected message integrity code based on the first discovery key, and verify the first terminal device based on the message integrity code and the expected message integrity code.

The sending unit 901 is further configured to send a verification response to the second terminal device after the processing unit 902 verifies the first terminal device based on the message integrity code and the expected message integrity code, where the verification response indicates a verification result for the first terminal device.

In an embodiment, the receiving unit 903 may receive a parameter obtaining request from the first terminal device, where the parameter obtaining request includes an identity of the first terminal device. The processing unit 902 may succeed in performing an authorization check on the first terminal device based on the identity of the first terminal device. After the authorization check succeeds, the processing unit 902 may allocate the ProSe temporary identity to the first terminal device, and obtain the first discovery key based on the ProSe temporary identity. The sending unit 901 may send a parameter obtaining response to the first terminal device, where the parameter obtaining response includes a key generation parameter. The processing unit 902 may further store a correspondence between the ProSe temporary identity and the first discovery key.

In an embodiment, the parameter obtaining request further includes ProSe information of the first terminal device. When the processing unit 902 succeeds in authenticating the first terminal device based on the identity of the first terminal device, the receiving unit 903 may obtain ProSe subscription information of the first terminal device from a unified data management network element based on the identity of the first terminal device and the ProSe information of the first terminal device. Then, after determining that the ProSe information of the first terminal device is consistent with the ProSe subscription information of the first terminal device, the processing unit 902 succeeds in performing the authorization check on the first terminal device.

In an embodiment, the parameter obtaining request further includes the ProSe information of the first terminal device. When the processing unit 902 succeeds in performing the authorization check on the first terminal device based on the identity of the first terminal device, the sending unit 901 may send a check request to the unified data management network element, to request to perform an authorization check on the first terminal device, where the check request includes the identity of the first terminal device. Then, the receiving unit 903 may receive a check response from the unified data management network element, where the check response indicates that the authorization check performed on the first terminal device succeeds.

In an embodiment, there are three methods for obtaining the first discovery key by the processing unit 902 based on the ProSe temporary identity.

In a first method, the processing unit 902 generates the first discovery key based on the ProSe temporary identity and a root key, where the root key is a key allocated or pre-configured for the first terminal device.

In a second method, the processing unit 902 obtains, through the receiving unit 903, the first discovery key from a key generation network element based on the ProSe temporary identity.

In a third method, the processing unit 902 obtains, through the receiving unit 903, a second discovery key from the key generation network element based on the identity, and generates the first discovery key based on the second discovery key and the ProSe temporary identity.

In an embodiment, the key generation parameter further includes some or all of the ProSe parameters except the ProSe temporary identity that are allocated by the first network element to the first terminal device, for example, some or all of a current time and a MAX offset. In an embodiment, the key generation parameter may further include another parameter, for example, a counter value.

In an embodiment, when the processing unit 902 obtains, through the receiving unit 903, the first discovery key from the key generation network element based on the ProSe temporary identity, the sending unit 901 may send a first key obtaining request to the key generation network element, where the first key obtaining request includes the identity and the ProSe temporary identity of the first terminal device. Then, the receiving unit 903 may receive a first key obtaining response from the key generation network element, where the first key obtaining response includes the first discovery key.

In an embodiment, when the processing unit 902 obtains, through the receiving unit 903, the second discovery key from the key generation network element based on the identity, the sending unit 901 may send a second key obtaining request to the key generation network element, where the second key obtaining request includes the identity of the first terminal device. Then, the receiving unit 903 may receive a second key obtaining response from the key generation network element, where the second key obtaining response includes the second discovery key.

In an embodiment, when generating the expected message integrity code based on the discovery key, the processing unit 902 may first generate a subkey based on the first discovery key, and then generate the expected message integrity code based on the subkey. Alternatively, the processing unit 902 may directly generate the expected message integrity code based on the discovery key.

In an embodiment, the key generation network element is any one of the following network elements:

an authentication server function network element, an access and mobility management function network element, an authentication and key management for applications anchor function network element, a bootstrapping server function network element, a 5G direct discovery name management function network element, or a key management network element, where the key management network element is a network element that stores the key pre-configured for the first terminal device.

In an embodiment, the processing unit 902 may further determine a validity time of the ProSe temporary identity, and store a correspondence between the validity time and the first discovery key.

In an embodiment, the processing unit 902 deletes the first discovery key after the validity time expires.

Based on a same inventive concept as that of the method embodiments, an embodiment of this application further provides a communication apparatus, configured to perform the method performed by the key generation network element or the AUSF network element in the foregoing method embodiments. For related features, reference may be made to the foregoing method embodiments. Details are not described herein again. As shown in FIG. 10, the communication apparatus may interact with a first network element in any one of the following two manners. The apparatus includes a receiving unit 1001, a processing unit 1002, and a sending unit 1003.

Manner 1:

The receiving unit 1001 is configured to receive a first key obtaining request from a first network element, where the first key obtaining request includes an identity and a key generation parameter of a terminal device.

The processing unit 1002 is configured to: determine a root key based on the identity of the first terminal device; and generate a discovery key at a ProSe granularity of the first terminal device based on the root key and the key generation parameter.

The sending unit 1003 is configured to send a first key obtaining response to the first network element, where the first key obtaining response includes the discovery key at the ProSe granularity of the first terminal device.

Manner 2:

The receiving unit 1001 is configured to receive a second key obtaining request from a first network element, where the first key obtaining request includes an identity of a terminal device.

The processing unit 1002 is configured to: determine a root key based on the identity of the first terminal device; and generate a discovery key at a terminal device granularity of the first terminal device based on the root key and the key generation parameter.

The sending unit 1003 is configured to send a second key obtaining response to the first network element, where the first key obtaining response includes the discovery key at the terminal device granularity of the first terminal device.

In an embodiment, the key generation network element is any one of the following network elements:

an authentication server function network element, an access and mobility management function network element, an authentication and key management for applications anchor function network element, a bootstrapping server function network element, a 5G direct discovery name management function network element, or a key management network element, where the key management network element is a network element that stores the key preconfigured for the first terminal device.

Based on a same inventive concept as that of the method embodiments, an embodiment of this application further provides a communication apparatus, configured to perform the method performed by the second terminal device or M-UE in the foregoing method embodiments. For related features, reference may be made to the foregoing method embodiments. Details are not described herein again. As shown in FIG. 11, the apparatus includes a receiving unit 1101, a processing unit 1102, and a sending unit 1103.

The receiving unit 1101 is configured to receive a ProSe request message broadcast by a first terminal device, where the ProSe request message includes a ProSe temporary identity and a message integrity code of the first terminal device.

The processing unit 1102 is configured to determine, based on the ProSe temporary identity, that a proximity service can be supported;

The sending unit 1103 is configured to send a verification request to a first network element after the processing unit 1102 determines, based on the ProSe temporary identity, that the proximity service can be supported, where the verification request includes the ProSe temporary identity and the message integrity code.

The receiving unit 1101 is further configured to receive a verification response from the first network element, where the verification response indicates a verification result for the first terminal device.

The processing unit 1102 is further configured to determine, based on the verification result, whether to establish a direct communication with the first terminal device.

Division into units in embodiments of this application is an example and is merely logical function division, and there may be another division manner during actual implementation. In addition, the functional units in embodiments of this application may be integrated into one processor, each of the units may exist alone physically, or two or more units are integrated into one module. The integrated unit may be implemented in a form of hardware, or may be implemented in a form of a software functional module.

When the integrated unit is implemented in the form of a software functional unit and sold or used as an independent product, the integrated unit may be stored in a computer-readable storage medium. Based on such an understanding, the technical solutions of this application essentially or the part contributing to the prior art, or all or a part of the technical solutions may be embodied in a form of a software product. The computer software product is stored in a storage medium, and includes several instructions for instructing a terminal device (which may be a personal computer, a mobile phone, a network device, or the like) or a processor to perform all or some steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

In this embodiment of this application, all the first network element, the key generation network element, the first terminal device, and the second terminal device may be presented in a form of function modules obtained through division in an integrated manner. The "module" herein may be a specific ASIC, a circuit, a processor that executes one or more software or firmware programs and a memory, an integrated logical circuit, and/or another device that can provide the foregoing function.

In a simple embodiment, a person skilled in the art may figure out that both the first network element and the key generation network element may be in a form shown in FIG. 12.

A communication apparatus 1200 shown in FIG. 12 includes at least one processor 1201 and a memory 1202, and, in an embodiment, may further include a communication interface 1203.

The memory 1202 may be a volatile memory such as a random access memory. Alternatively, the memory may be a non-volatile memory, for example, a read-only memory, a flash memory, a hard disk drive (HDD), or a solid-state drive (SSD). Alternatively, the memory 1202 is any other medium that can be for carrying or storing expected program code in a form of instructions or a data structure and that can be accessed by a computer. However, this is not limited thereto. The memory 1202 may be a combination of the foregoing memories.

In this embodiment of this application, a specific connection medium between the processor 1201 and the memory 1202 is not limited. In this embodiment of this application, the memory 1202 is connected to the processor 1201 through a bus 1204 in the figure. The bus 1204 is indicated by a thick line in the figure. A mode of connection between other components is schematically described, and is not limited thereto. The bus 1204 may be classified into an address bus, a data bus, a control bus, and the like. For ease of description, the bus in FIG. 12 is represented by using only one bold line, but it does not indicate that there is only one bus or one type of bus.

The processor 1201 may have a data sending/receiving function, and can communicate with another device. In the apparatus shown in FIG. 12, an independent data transceiver module, for example, the communication interface 1203, may also be disposed and is configured to send/receive data. When communicating with the another device, the processor 1201 may perform data transmission through the communication interface 1203.

When the first network element is in the form shown in FIG. 12, the processor 1201 in FIG. 12 may invoke computer-executable instructions stored in the memory 1202, so that the session management network element may perform the method performed by the first network element or the A-5G DDNMF network element in any one of the foregoing method embodiments.

Specifically, all functions/implementation processes of the sending unit, the receiving unit, and the processing unit in FIG. 9 may be implemented by the processor 1201 in FIG. 12 by invoking the computer-executable instructions stored in the memory 1202. Alternatively, a function/implementation process of the processing unit in FIG. 9 may be implemented by the processor 1201 in FIG. 12 by invoking the computer-executable instructions stored in the memory 1202, and functions/implementation processes of the sending unit and the receiving unit in FIG. 9 may be implemented by the communication interface 1203 in FIG. 12.

When the key generation network element is in the form shown in FIG. 12, the processor 1201 in FIG. 12 may invoke computer-executable instructions stored in the memory 1202, so that the key generation network element may perform the method performed by the key generation network element or the AUSF network element in any one of the foregoing method embodiments.

Specifically, all functions/implementation processes of the receiving unit, the sending unit, and the processing unit in FIG. 10 may be implemented by the processor 1201 in FIG. 12 by invoking the computer-executable instructions stored in the memory 1202. Alternatively, a function/implementation process of the processing unit in FIG. 10 may be implemented by the processor 1201 in FIG. 12 by invoking the computer-executable instructions stored in the memory 1202, and functions/implementation processes of the receiving unit and the sending unit in FIG. 10 may be implemented by the communication interface 1203 in FIG. 12.

Figure 13:
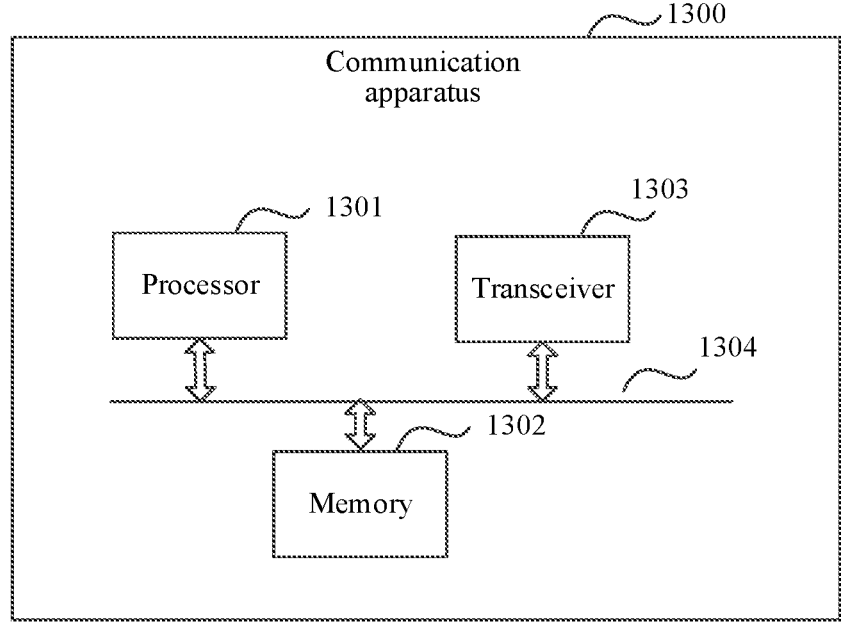

In a simple embodiment, a person skilled in the art may figure out that both the first terminal device and the second terminal device may be in a form shown in FIG. 13.

A communication apparatus 1300 shown in FIG. 13 includes at least one processor 1301 and a memory 1302, and, in an embodiment, may further include a transceiver 1303.

The processor 1301 and the memory 1302 are similar to the processor 1201 and the memory 1202. For details, refer to the foregoing content. Details are not described herein again.

In this embodiment of this application, a specific connection medium between the processor 1301 and the memory 1302 is not limited. In this embodiment of this application, the memory 1302 is connected to the processor 1301 through a bus 1304 in the figure. The bus 1304 is indicated by a thick line in the figure. A mode of connection between other components is schematically described, and is not limited thereto. The bus 1304 may be classified into an address bus, a data bus, a control bus, and the like. For ease of representation, only one bold line is used to represent the bus in FIG. 13, but this does not mean that there is only one bus or only one type of bus.

The processor 1301 may have a data sending/receiving function, and can communicate with another device. In the apparatus shown in FIG. 13, an independent data transceiver module, for example, the transceiver 1303, may also be disposed and is configured to send/receive data. When communicating with the another device, the processor 1301 may perform data transmission through the transceiver 1303.

When the first terminal device is in the form shown in FIG. 13, the processor 1301 in FIG. 13 may invoke computer-executable instructions stored in the memory 1302, so that the first terminal device may perform the method performed by the first terminal device or A-UE in any one of the foregoing method embodiments.

Specifically, all functions/implementation processes of the sending unit, the receiving unit, and the processing unit in FIG. 8 may be implemented by the processor 1301 in FIG. 13 by invoking the computer-executable instructions stored in the memory 1302. Alternatively, a function/implementation process of the processing unit in FIG. 8 may be implemented by the processor 1301 in FIG. 13 by invoking the computer-executable instructions stored in the memory 1302, and functions/implementation processes of the sending unit and the receiving unit in FIG. 8 may be implemented by the transceiver 1303 in FIG. 13.

When the second terminal device is in the form shown in FIG. 13, the processor 1301 in FIG. 13 may invoke computer-executable instructions stored in the memory 1302, so that the first terminal device may perform the method performed by the second terminal device or M-UE in any one of the foregoing method embodiments.

Specifically, all functions/implementation processes of the sending unit, the receiving unit, and the processing unit in FIG. 11 may be implemented by the processor 1301 in FIG. 13 by invoking the computer-executable instructions stored in the memory 1302. Alternatively, a function/implementation process of the processing unit in FIG. 11 may be implemented by the processor 1301 in FIG. 13 by invoking the computer-executable instructions stored in the memory 1302, and functions/implementation processes of the sending unit and the receiving unit in FIG. 11 may be implemented by the transceiver 1303 in FIG. 13.

In the method, a person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A secure communication method, comprising:
    sending, by a first terminal device, a parameter obtaining request to a first network element, wherein the parameter obtaining request comprises an identity of a first terminal device;
    receiving, by the first terminal device from the first network element, a parameter obtaining response comprising a key generation parameter, wherein the key generation parameter comprises a ProSe temporary identity of the first terminal device that is allocated by the first network element only after an authorization check on the first terminal device succeeds;
    generating, by the first terminal device, a first discovery key at a ProSe granularity by inputting a root key and the key generation parameter, comprising the ProSe temporary identity, into a key derivation function;
    generating, by the first terminal device, a message integrity code based on the first discovery key; and
    sending, by the first terminal device, a ProSe request message, wherein the ProSe request message comprises the ProSe temporary identity and the message integrity code.

2. The method according to claim 1, wherein the generating, by the first terminal device, the message integrity code based on the first discovery key comprises:
    generating, by the first terminal device, a subkey based on the first discovery key; and
    generating, by the first terminal device, the message integrity code based on the subkey.

3. The method according to claim 1, wherein the parameter obtaining response further comprises a validity time of the ProSe temporary identity.

4. The method according to claim 3, further comprising:
    storing, by the first terminal device, the first discovery key and the validity time.

5. The method according to claim 4, further comprising:
    deleting, by the first terminal device, the first discovery key after the validity time expires.

6. A secure communication method, comprising:
    receiving, by a first network element, a parameter obtaining request from a first terminal device, wherein the parameter obtaining request comprises an identity of the first terminal device;
    allocating, by the first network element, a ProSe temporary identity to the first terminal device only after an authorization check on the first terminal device based on the identity of the first terminal device succeeds;
    sending, by the first network element, a key generation parameter, wherein the key generation parameter comprises the ProSe temporary identity of the first terminal device;
    receiving, by the first network element, a verification request from a second terminal device, wherein the verification request comprises the ProSe temporary identity and a message integrity code;
    determining, by the first network element, a first discovery key at a ProSe granularity of the first terminal device by inputting the ProSe temporary identity and a root key into a key derivation function;
    generating, by the first network element, an expected message integrity code based on the first discovery key; and
    sending, by the first network element, a verification response to the second terminal device after verifying the first terminal device based on the message integrity code and the expected message integrity code, wherein the verification response indicates a verification result for the first terminal device.

7. The method according to claim 6, wherein the sending, by the first network element, the key generation parameter comprises:
    obtaining, by the first network element, the first discovery key based on the ProSe temporary identity; and
    sending, by the first network element, a parameter obtaining response to the first terminal device, wherein the parameter obtaining response comprises the key generation parameter.

8. The method according to claim 6, further comprising:
    storing, by the first network element, a correspondence between the ProSe temporary identity and the first discovery key.

9. The method according to claim 7, wherein the obtaining, by the first network element, the first discovery key based on the ProSe temporary identity comprises:
    generating, by the first network element, the first discovery key, wherein the root key is a key allocated or pre-configured for the first terminal device;
    obtaining, by the first network element, the first discovery key from a key generation network element based on the ProSe temporary identity; or
    obtaining, by the first network element, a second discovery key from the key generation network element based on the identity of the first terminal device, and generating the first discovery key based on the second discovery key and the ProSe temporary identity.

10. The method according to claim 9, wherein the obtaining, by the first network element, the first discovery key from the key generation network element based on the ProSe temporary identity comprises:

sending, by the first network element, a first key obtaining request to the key generation network element, wherein the first key obtaining request comprises the ProSe temporary identity and the identity of the first terminal device; and receiving, by the first network element, a first key obtaining response from the key generation network element, wherein the first key obtaining response comprises the first discovery key.

11. The method according to claim 9, wherein the obtaining, by the first network element, the second discovery key from the key generation network element based on the identity of the first terminal device comprises:

sending, by the first network element, a second key obtaining request to the key generation network element, wherein the second key obtaining request comprises the identity of the first terminal device; and receiving, by the first network element, a second key obtaining response from the key generation network element, wherein the second key obtaining response comprises the second discovery key.

12. The method according to claim 6, wherein the generating, by the first network element, the expected message integrity code based on the first discovery key comprises:

generating, by the first network element, a subkey based on the first discovery key; and generating, by the first network element, the expected message integrity code based on the subkey.

13. An apparatus, comprising:

a processor coupled to a memory storing instructions and configured to execute the instructions to cause the apparatus to:

send a parameter obtaining request to a first network element, wherein the parameter obtaining request comprises an identity of the apparatus; and receive a parameter obtaining response from the first network element, wherein the parameter obtaining response comprises a key generation parameter, wherein the key generation parameter comprises a ProSe temporary identity of the apparatus that is allocated by the first network element only after an authorization check on the apparatus succeeds;

generate a first discovery key at a ProSe granularity by inputting a root key and the key generation parameter, comprising the ProSe temporary identity, into a key derivation function;

generate a message integrity code based on the first discovery key; and send a ProSe request message, wherein the ProSe request message comprises the ProSe temporary identity and the message integrity code.

14. The apparatus according to claim 13, wherein the instructions cause the apparatus to generate the message integrity code based on the first discovery key by:

generating a subkey based on the first discovery key; and generating the message integrity code based on the sub-key.

15. The apparatus according to claim 13, wherein the parameter obtaining response further comprises a validity time of the ProSe temporary identity; and wherein the instructions further cause the apparatus to store the first discovery key and the validity time.

16. The apparatus according to claim 15, wherein the instructions further cause the apparatus to delete the first discovery key after the validity time expires.

17. An apparatus, comprising:

a processor coupled to a memory storing instructions and configured to execute the instructions to cause the apparatus to:

receive a parameter obtaining request from a first terminal device, wherein the parameter obtaining request comprises an identity of the first terminal device;

allocate a ProSe temporary identity to the first terminal device only after an authorization check on the first terminal device based on the identity of the first terminal device succeeds;

send a key generation parameter, wherein the key generation parameter comprises the ProSe temporary identity of the first terminal device;

receive a verification request from a second terminal device, wherein the verification request comprises the ProSe temporary identity and a message integrity code;

determine a first discovery key at a ProSe granularity of the first terminal device by inputting the ProSe temporary identity and a root key into a key derivation function;

generate an expected message integrity code based on the first discovery key; and send a verification response to the second terminal device after verifying the first terminal device based on the message integrity code and the expected message integrity code, wherein the verification response indicates a verification result for the first terminal device.

18. The apparatus according to claim 17, wherein the instructions cause the apparatus to generate the message integrity code based on the first discovery key by:

obtaining the first discovery key based on the ProSe temporary identity; and sending a parameter obtaining response to the first terminal device, wherein the parameter obtaining response comprises the key generation parameter.

* * * * *